US010607230B2

(12) United States Patent
Adams et al.

(10) Patent No.: US 10,607,230 B2
(45) Date of Patent: Mar. 31, 2020

(54) AUGMENTED REALITY DYNAMIC AUTHENTICATION FOR ELECTRONIC TRANSACTIONS

(71) Applicant: Bank of America Corporation, Charlotte, NC (US)

(72) Inventors: Amanda J. Adams, Flintshire (GB); Joseph N. Johansen, Rock Hill, SC (US); Michael Ogrinz, Easton, CT (US); Heather Dolan, Sarasota, FL (US); William P. Jacobson, Matthews, NC (US); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 776 days.

(21) Appl. No.: 15/367,551

(22) Filed: Dec. 2, 2016

(65) Prior Publication Data

US 2018/0158060 A1 Jun. 7, 2018

(51) Int. Cl.
*G06Q 40/00* (2012.01)
*G06Q 20/40* (2012.01)
(Continued)

(52) U.S. Cl.
CPC ........... *G06Q 20/409* (2013.01); *G06F 3/017* (2013.01); *G06Q 20/12* (2013.01);
(Continued)

(58) Field of Classification Search
CPC .................................................... G06Q 40/00
See application file for complete search history.

(56) References Cited

U.S. PATENT DOCUMENTS 5,999,944 A    12/1999  Lipkin
6,408,257 B1    6/2002  Harrington et al.
(Continued)

FOREIGN PATENT DOCUMENTS

CN    103635920 A    3/2014

OTHER PUBLICATIONS

Holger Glockner, Kai Jannek, Johannes Mahn, Björn Theis, Augmented Reality in Logistics, 2014, DHL Customer Solutions & Innovation, web, 1-21 (Year: 2014).*
(Continued)

*Primary Examiner* — I Jung Liu
(74) *Attorney, Agent, or Firm* — Michael A. Springs

(57) ABSTRACT

A system for authorizing an electronic transaction in an augmented reality environment comprises an augmented reality user device and an authentication server. The augmented reality user device includes a display that overlays virtual objects onto a field of view of the user. The user device receives a request to verify information about a payment card used in an electronic transaction. The request includes a virtual authentication object, which is a virtual representation of an object capable of being manipulated by the user in a particular sequence to enter an authentication code. The user device displays the virtual authentication object to the user and detects gestures performed on the virtual authentication object. The user device sends the detected gestures to the authentication server. The authentication server determines the authentication code using the virtual authentication object and the detected gestures, and uses it to authorize the transaction.

20 Claims, 8 Drawing Sheets

(51) Int. Cl.
*G06F 3/01* (2006.01)
*H04W 12/06* (2009.01)
*H04L 29/06* (2006.01)
*G06Q 20/12* (2012.01)
*G06Q 20/32* (2012.01)

(52) U.S. Cl.
CPC ....... *G06Q 20/3224* (2013.01); *G06Q 20/401* (2013.01); *G06Q 20/40145* (2013.01); *G06Q 40/00* (2013.01); *H04L 63/0861* (2013.01); *H04W 12/06* (2013.01); *H04L 2463/102* (2013.01)

(56) References Cited

U.S. PATENT DOCUMENTS

| | | | |
|---|---|---|---|
| 6,602,075 | B2 | 8/2003 | Adams |
| 6,602,076 | B2 | 8/2003 | Adams |
| 6,625,299 | B1 | 9/2003 | Meisner et al. |
| 6,871,140 | B1 | 3/2005 | Florance et al. |
| 6,941,001 | B1 | 9/2005 | Bolle et al. |
| 7,099,850 | B1 | 8/2006 | Mann, II et al. |
| 7,392,208 | B2 | 6/2008 | Morse et al. |
| 7,680,694 | B2 | 3/2010 | Glazer et al. |
| 7,817,104 | B2 | 10/2010 | Ryu et al. |
| 7,831,471 | B2 | 11/2010 | Adams |
| 7,834,883 | B2 | 11/2010 | Adams |
| 8,069,095 | B2 | 11/2011 | Glazer et al. |
| 8,165,924 | B2 | 4/2012 | Smyers et al. |
| 8,285,638 | B2 | 10/2012 | Jung et al. |
| 8,326,704 | B2 | 12/2012 | Glazer et al. |
| 8,396,738 | B1 | 3/2013 | Allan et al. |
| 8,417,625 | B2 | 4/2013 | Bannerjee et al. |
| 8,433,650 | B1 | 4/2013 | Thomas |
| 8,438,001 | B2 | 5/2013 | Natarajan et al. |
| 8,438,110 | B2 | 5/2013 | Calman et al. |
| 8,442,295 | B2 | 5/2013 | Sam |
| 8,442,906 | B1 | 5/2013 | Thomas |
| 8,451,266 | B2 | 5/2013 | Hertenstein |
| 8,577,803 | B2 | 11/2013 | Chatterjee et al. |
| 8,589,255 | B2 | 11/2013 | Glazer et al. |
| 8,601,386 | B2 | 12/2013 | Altberg et al. |
| 8,611,601 | B2 | 12/2013 | Calman et al. |
| 8,612,363 | B2 | 12/2013 | Karkanias et al. |
| 8,635,104 | B2 | 1/2014 | Adams |
| 8,660,951 | B2 | 2/2014 | Calman et al. |
| 8,688,594 | B2 | 4/2014 | Thomas et al. |
| 8,718,612 | B2 | 5/2014 | Calman et al. |
| 8,743,145 | B1 | 6/2014 | Price |
| 8,803,916 | B1 | 8/2014 | Paczkowski et al. |
| 8,805,739 | B2 | 8/2014 | Brown et al. |
| 8,810,599 | B1 | 8/2014 | Tseng |
| 8,890,896 | B1 | 11/2014 | Tseng |
| 8,929,591 | B2 | 1/2015 | Calman et al. |
| 8,970,569 | B2 * | 3/2015 | Vilcovsky ............. G06Q 30/00 345/212 |
| 8,990,914 | B2 | 3/2015 | Da Cruz Pinto et al. |
| 9,007,473 | B1 | 4/2015 | Worley, III et al. |
| 9,026,486 | B2 | 5/2015 | Doorhy et al. |
| 9,044,673 | B1 | 6/2015 | Ahuja et al. |
| 9,047,636 | B2 | 6/2015 | Ross |
| 9,066,200 | B1 | 6/2015 | Loxam et al. |
| 9,082,149 | B2 | 7/2015 | Argue et al. |
| 9,092,600 | B2 | 7/2015 | Scavezze et al. |
| 9,092,898 | B1 | 7/2015 | Fraccaroli et al. |
| 9,100,493 | B1 | 8/2015 | Zhou et al. |
| 9,105,013 | B2 | 8/2015 | Chavez |
| 9,111,383 | B2 | 8/2015 | Fein et al. |
| 9,153,074 | B2 | 10/2015 | Zhou et al. |
| 9,223,950 | B2 | 12/2015 | Li et al. |
| 9,230,367 | B2 | 1/2016 | Stroila |
| 9,251,504 | B2 | 2/2016 | Chavez |
| 9,317,860 | B2 | 4/2016 | Calman et al. |
| 9,331,969 | B2 | 5/2016 | Barak et al. |
| 9,338,589 | B2 | 5/2016 | Loxam et al. |
| 9,342,928 | B2 | 5/2016 | Rasane et al. |
| 9,349,118 | B2 | 5/2016 | Chavez |
| 9,355,123 | B2 | 5/2016 | Wnuk et al. |
| 9,367,878 | B2 | 6/2016 | Rao |
| 10,223,710 | B2 * | 3/2019 | Purves ................. G06Q 40/08 |
| 2002/0044152 | A1 | 4/2002 | Abbott, III et al. |
| 2010/0238161 | A1 | 9/2010 | Varga et al. |
| 2011/0055049 | A1 * | 3/2011 | Harper ................. G06Q 40/00 705/35 |
| 2011/0134108 | A1 | 6/2011 | Hertenstein |
| 2012/0156668 | A1 | 6/2012 | Zelin |
| 2012/0232966 | A1 | 9/2012 | Calman et al. |
| 2012/0232968 | A1 | 9/2012 | Calman et al. |
| 2012/0232976 | A1 | 9/2012 | Calman et al. |
| 2012/0232977 | A1 | 9/2012 | Calman et al. |
| 2012/0310826 | A1 | 12/2012 | Chatterjee |
| 2013/0166332 | A1 | 6/2013 | Hammad |
| 2013/0226682 | A1 | 8/2013 | Grossman |
| 2014/0040127 | A1 | 2/2014 | Chatterjee et al. |
| 2014/0067712 | A1 | 3/2014 | Prasad et al. |
| 2014/0100994 | A1 | 4/2014 | Tatzel et al. |
| 2014/0172559 | A1 | 6/2014 | Calman et al. |
| 2014/0181678 | A1 | 6/2014 | Louchheim et al. |
| 2014/0279426 | A1 | 9/2014 | Holman et al. |
| 2014/0330511 | A1 | 11/2014 | Tison et al. |
| 2014/0337175 | A1 | 11/2014 | Katzin et al. |
| 2014/0379468 | A1 | 12/2014 | Ganesh et al. |
| 2015/0012426 | A1 | 1/2015 | Purves et al. |
| 2015/0046284 | A1 | 2/2015 | Hart |
| 2015/0058229 | A1 | 2/2015 | Wiacek et al. |
| 2015/0066722 | A1 | 3/2015 | Calman et al. |
| 2015/0073907 | A1 | 3/2015 | Purves et al. |
| 2015/0082203 | A1 | 3/2015 | James et al. |
| 2015/0154446 | A1 | 6/2015 | Masood et al. |
| 2015/0186984 | A1 | 7/2015 | Loganathan |
| 2015/0206218 | A1 | 7/2015 | Banerjee et al. |
| 2015/0221151 | A1 | 8/2015 | Bacco et al. |
| 2015/0229750 | A1 | 8/2015 | Zhou et al. |
| 2015/0254510 | A1 | 9/2015 | McKinnon et al. |
| 2015/0294322 | A1 | 10/2015 | Grigg et al. |
| 2015/0302027 | A1 | 10/2015 | Wnuk et al. |
| 2015/0324562 | A1 | 11/2015 | Scavezze et al. |
| 2015/0339468 | A1 | 11/2015 | Son et al. |
| 2015/0348329 | A1 | 12/2015 | Carre et al. |
| 2015/0363761 | A1 | 12/2015 | Grigg et al. |
| 2015/0363764 | A1 | 12/2015 | Grigg et al. |
| 2016/0049095 | A1 | 2/2016 | Yannier et al. |
| 2016/0063484 | A1 | 3/2016 | Carpenter et al. |
| 2016/0063517 | A1 | 3/2016 | Sorensen |
| 2016/0078449 | A1 | 3/2016 | Banerjee |
| 2016/0098936 | A1 | 4/2016 | Solomon |
| 2016/0171767 | A1 | 6/2016 | Anderson |
| 2016/0188861 | A1 | 6/2016 | Todeschini |
| 2016/0189426 | A1 | 6/2016 | Thomas et al. |
| 2016/0206960 | A1 | 7/2016 | Allen et al. |
| 2016/0210784 | A1 | 7/2016 | Ramsby et al. |
| 2016/0210790 | A1 | 7/2016 | Rasane et al. |
| 2016/0217623 | A1 | 7/2016 | Singh |

OTHER PUBLICATIONS

Saettler, M., "Westpac integrates augmented reality into bank account management," http://www.mobilecommercedaily.com/westpac-integrates-augmented-reality-into-bank-account-management, Aug. 6, 2014, 8 pages.
Dolan, H. et al., "Facilitating Digital Data Transfers Using Augmented Reality Display Devices," U.S. Appl. No. 15/353,005, filed Nov. 16, 2016, 50 pages.
Johansen, J. N. et al., "Real World Gamification Using Augmented Reality User Devices ," U.S. Appl. No. 15/377,690, filed Dec. 13, 2016, 70 pages.
Adams, A. J. et al., "Virtual Reality Dynamic Authentication," U.S. Appl. No. 15/367,590, filed Dec. 2, 2016, 58 pages.
Lee, J. et al., "Contextual Augmented Reality Overlays," U.S. Appl. No. 15/363,388, filed Nov. 29, 2016, 50 pages.
Waldron, W. H. et al., "Virtual Assessments Using Augmented Reality User Devices," U.S. Appl. No. 15/364,927, filed Nov. 30, 2016, 85 pages.

(56) References Cited

OTHER PUBLICATIONS

Votaw, E. S. et al., "Remote Document Execution and Network Transfer Using Augmented Reality Display Devices," U.S. Appl. No. 15/353,370, filed Nov. 16, 2016, 42 pages.
Dolan, H. et al., "Augmented Reality Headset and Digital Wallet," U.S. Appl. No. 15/363,692, filed Nov. 29, 2016, 41 pages.
Johansen, J. N., "Facilitating Dynamic Across-Network Location Determination Using Augmented Reality Display Devices," U.S. Appl. No. 15/372,909, filed Dec. 8, 2016, 44 pages.
Ogrinz, M. et al., "Facilitating Network Security Analysis Using Virtual Reality Display Devices." U.S. Appl. No. 15/367,896, filed Dec. 2, 2016, 44 pages.
Dintenfass, K., "Property Assessments Using Augmented Reality User Devices," U.S. Appl. No. 15/367,435, filed Dec. 2, 2016, 81 pages.
Wadley, C. D. et al., "Facilitating Across-Network, Multi-User Sessions Using Augmented Reality Display Devices," U.S. Appl. No. 15/397,086, filed Jan. 3, 2017, 49 pages.
Dintenfass, K., "Geo-targeted Property Analysis Using Augmented Reality User Devices," U.S. Appl. No. 15/367,554, filed Dec. 2, 2016, 80 pages.
Lee, J., "Facilitating Digital Data Transfers Using Virtual Reality Display Devices," U.S. Appl. No. 15/363,185, filed Nov. 29, 2016, 52 pages.
Dintenfass, K., "Real Estate Property Project Analysis Using Augmented Reality User Devices," U.S. Appl. No. 15/367,822, filed Dec. 2, 2016, 81 pages.
Adams, A. J. et al., "Augmented Reality Dynamic Authentication," U.S. Appl. No. 15/367,502, filed Dec. 2, 2016, 57 pages.
Waldron, W. H. et al., "Virtual Behavior Training Using Augmented Reality User Devices," U.S. Appl. No. 15/377,795, filed Dec. 13, 2016, 71 pages.
Dolan, H. et al., "User Authentication and Authorization for Electronic Transaction," U.S. Appl. No. 15/363,495, filed Nov. 29, 2016, 41 pages.
Waldron, W. H. et al., "Geolocation Notifications Using Augmented Reality User Devices," U.S. Appl. No. 15/365,272, filed Nov. 30, 2016, 85 pages.
Waldron, W. H. et al., "Object Recognition and Analysis Using Augmented Reality User Devices," U.S. Appl. No. 15/365,511, filed Nov. 30, 2016, 86 pages.
Wadley, C. D. et al., "Facilitating Across-Network Handoffs for Devices Using Augmented Reality Display Devices," U.S. Appl. No. 15/397,031, filed Jan. 3, 2017, 49 pages.
Wadley, C. D. et al., "Facilitating Across-Network Handoffs for an Assistant Using Augmented Reality Display Devices," U.S. Appl. No. 15/397,125, filed Jan. 3, 2017, 48 pages.
Johansen, J. N., "Facilitating Dynamic Across-Network Location Determination Using Augmented Reality Display Devices," U.S. Appl. No. 15/372,964, filed Dec. 8, 2016, 43 pages.

* cited by examiner

AUGMENTED REALITY DYNAMIC AUTHENTICATION FOR ELECTRONIC TRANSACTIONS

TECHNICAL FIELD

The present disclosure relates generally to performing authentication using an augmented or virtual reality display device that displays authentication objects in an augmented or virtual reality scene.

BACKGROUND

Securely transferring data and information across a network poses several technical challenges. Networks are susceptible to attacks by unauthorized users trying to gain access to sensitive information being communicated across the network. Unauthorized access to a network may compromise the security of the data and information being communicated across the network.

SUMMARY

In some embodiments, a virtual reality system performs authorization of a user. The user may enter an authorization code by manipulating a virtual object. For example, the system may include a virtual reality user device. The virtual reality user device may include a display, memory, and processors. The display is configured to display a virtual environment to a user. The virtual reality user device receives a virtual authentication object.

The virtual authentication object is a virtual representation of an object capable of being manipulated by a user in a particular sequence to enter an authentication code. For example, the virtual authentication object may be a virtual keypad or combination dial. The virtual authentication object may be a number of blocks, or other geometric shapes, where a particular arrangement of the shapes in space or in relation to each other represents an authentication code.

The virtual reality user device displays the virtual authentication object to the user via the display. The user may manipulate the virtual authentication object to enter an authentication code. The virtual reality user device detects the dynamic gestures performed by the user and forms an authentication request. The information about the detected gestures may include spatial information describing how the user manipulated the virtual authentication object and may include information about how fast or slow the user manipulated the virtual authentication object.

The authentication request includes the virtual authentication object, the detected one or more gestures, and an identifier of the user. The virtual reality user device sends the authentication request to an authentication server.

The authentication server comprises a database of user identifiers and associated authentication codes. The authentication server receives the authentication request from the virtual reality user device and combines the virtual authentication object with the detected gestures to determine the authentication code entered by the user. The authentication server authorizes the user by comparing the determined authentication code with an authentication code associated with the user stored in the database and sends an authorization response to the virtual reality user device.

In particular embodiments, the authorization server sends the virtual authentication object to the virtual reality user device. In other embodiments, the virtual reality user device obtains the virtual authentication object from a different entity, or may autonomously determine the virtual authentication object.

In particular embodiments, the virtual authentication object may be made up of two parts. For example, the virtual authentication object may be created by combining a virtual object template with a virtual object overlay. The template may describe the structure of the virtual authentication object and the overlay may provide values associated with particular inputs of the virtual authentication object.

For example, a virtual object template may describe a keypad with three rows of buttons. The virtual object overlay may specify numbers or letters for each button of the keypad. Different overlays may be used with the same template, and thus different user input patterns may still result in the same authentication code. This prevents an attacker from observing and duplicating a particular input pattern, because without knowledge of the virtual overlay, the attacker does not know which values are associated with which inputs.

In some embodiments, the virtual object template may correspond to a physical object, such as a physical keypad. The virtual template may specify values for each input of the physical keypad. In an augmented reality environment, an augmented reality user device may overlay the virtual template on the physical object in the field of view of the user. For example, a physical keypad may include three rows of keys without any markings or labels on the keys. The augmented reality user device may display numbers on a physical keypad according to the template so that the user sees the physical keypad with virtual labels overlaid on each key.

An example of an augmented reality authentication system includes an electronic transaction terminal, such as an automated teller machine, with a blank keypad, a user with an augmented reality user device, and an authentication server.

For example, in some embodiments the automatic teller machine comprises a physical keypad. The physical keypad comprises one more unmarked buttons for a user to enter an authentication code.

The augmented reality user device may receive a virtual keypad overlay. The virtual keypad overlay assigns values to each of the one or more unmarked buttons of the physical keypad. The augmented reality user device uses the virtual keypad overlay to display values on the one more unmarked buttons of the physical keypad.

The automatic teller machine detects an input sequence entered by the user on the physical keypad and sends the input sequence to the authentication server. The authentication server uses the input sequence and the virtual keypad overlay to determine an authentication code. For example, the input sequence indicates which buttons were pressed by the user and the virtual keypad overlay indicates which values were assigned to the pressed buttons. The authentication server compares the determined authentication code with the authentication code associated with the user in its database to authorize the user and sends an authentication response to the automatic teller machine.

In other embodiments, the electronic transaction terminal, such as an automatic teller machine, may not have an input device for the user to enter an authentication code. In particular embodiments, the augmented reality user device may display a virtual authentication object to the user. The augmented reality user device may detect gestures performed on the virtual authentication object and send the detected gestures and the virtual authentication object to the authentication server for authentication of the user. Particular embodiments may use a virtual authentication object instead of an input device of the electronic transaction terminal (e.g., an automatic teller machine may authenticate in either a conventional manner with a physical input device, or using any of virtual authentication objects described herein).

In particular embodiments the augmented reality device may communicate directly with the authentication server to exchange virtual authentication objects or virtual object overlays. In some embodiments, the electronic transaction terminal may exchange virtual authentication objects or virtual object overlays between the augmented reality user device and the authentication server.

Another example of an augmented reality authentication system includes a user terminal, an augmented reality user device, and an authentication server. The user terminal initiates and participates in an electronic transaction (e.g., an online purchase from an e-commerce website, an electronic auction checkout, etc.). The user terminal transmits information about a payment card used to pay for the transaction. To verify the transaction (i.e., a card-not-present transaction), the augmented reality user device receives a request to verify the payment card. The request includes a virtual authentication object. The augmented reality user device displays the virtual authentication object to the user via the display and detects one or more gestures performed by the user on the displayed virtual authentication object. The augmented reality user device sends the detected one or more gestures to the authentication server.

The authentication server includes a database that associates a payment card with an authentication code. The authentication server determines the authentication code by combining the virtual authentication object and the detected gestures. By comparing the determined authentication code with an authentication code associated with the payment card in the database, the authentication server verifies the payment card for use with the electronic transaction.

In particular embodiments, the augmented reality user device sends the virtual authentication object to the authentication server. The augmented reality user device may receive the request to verify the electronic transaction from the authentication server or a transaction server.

In particular embodiments, the augmented reality user device receives a transaction identifier associated with the electronic transaction; associates the detected one or more gestures with the transaction identifier; and sends the transaction identifier to the authentication server.

The embodiments described herein present several technical advantages. In one embodiment, an augmented or virtual reality user device displays or overlays a virtual authentication object within a field of view of a user via a display. The user dynamically manipulates the virtual authentication object to enter an authentication code. The authentication code may be used for various activities such as authorizing an electronic transaction, gaining access to a restricted area, etc. An attacker is unable to observe or record the user entering the authentication code because the virtual authentication object is only visible to the user of the augmented or virtual reality user device. Moreover, using a combination of virtual object templates and virtual object overlays, the gestures for entering a particular authentication code may vary each time the user enters the authentication code. Thus, particular embodiments improve the security of an electronic transaction conducted over a network, access to a particular location, etc.

As another advantage, particular embodiments improve the security of a network, of a physical location, of a particular transaction, etc., because particular embodiments are not limited to a conventional one-dimensional password. Particular embodiments enable two, three, and even four-dimensional dynamic passwords (e.g., manipulating objects in three-dimensional space over a particular time interval). The dynamic passwords are less susceptible to brute-force attacks than a conventional one-dimensional password.

As another advantage, particular embodiments of a virtual or augmented reality authentication system may be particularly useful for providing authorization, such as network access, to users with vision impairment or other handicaps preventing them from recognizing visual input labels associated with conventional authentication systems, such as a keypad or combination lock. For example, in some embodiments the virtual or augmented reality authentication system enables a vision-impaired person to move a hand or finger in a particular pattern to enter an authentication code. Thus, the virtual or augmented reality dynamic authentication system provides an improved user interface for authentication.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
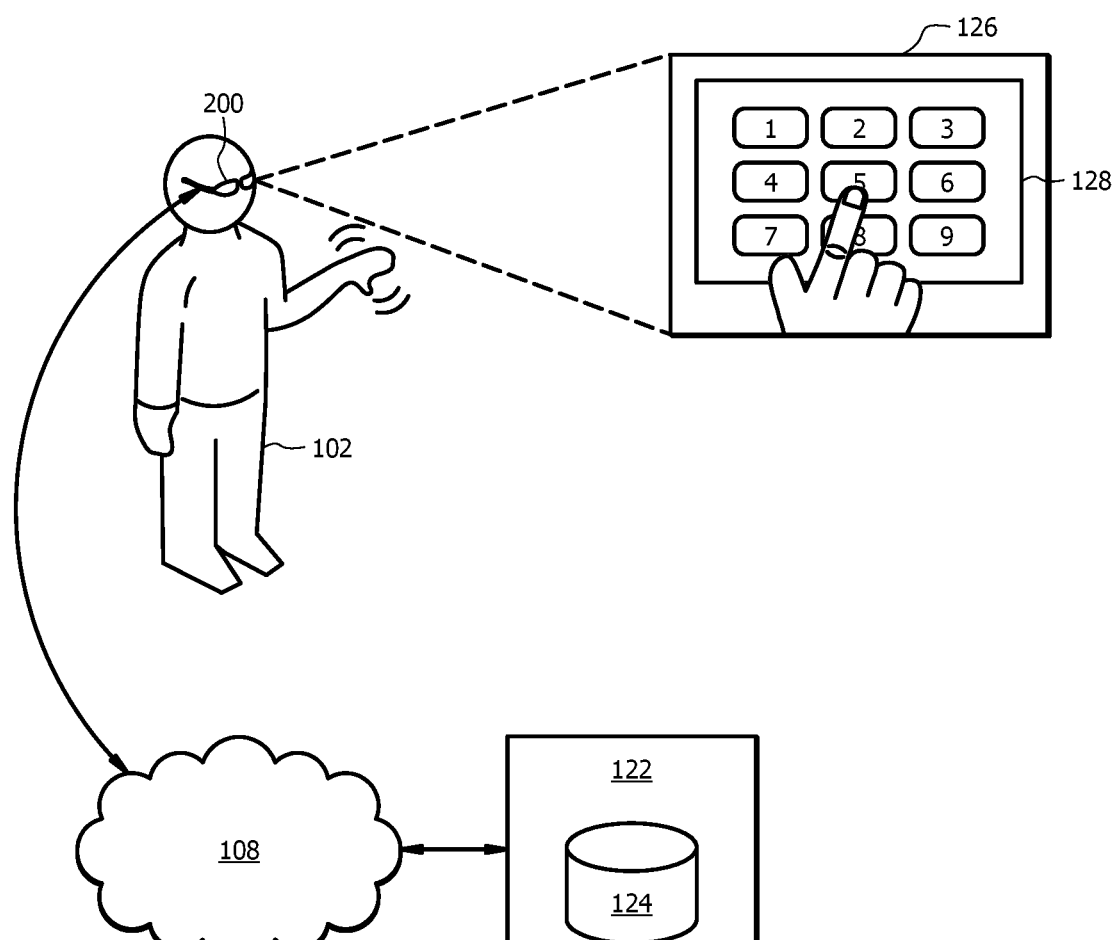
FIG. 1 is a schematic diagram of an embodiment of a virtual reality system for performing dynamic user authorization.

Securely authenticating users across a data network poses several technical challenges. Networks are susceptible to attacks by unauthorized users trying to gain access to sensitive information being communicated across the network. Unauthorized access to a network may compromise the security of the data and information being communicated across the network.

A user may participate in an electronic transaction by sending sensitive account information across the network. The user may enter authentication information into an electronic transaction terminal, into a user device, or any other suitable user interface for entering an authentication code. Without the ability to authenticate a user, the system may be vulnerable to spoofing and other kinds of fraudulent activities. For example, a user entering authentication information in a public place may be susceptible to an attacker capturing the authentication information by direct observation or by recording. Particular embodiments provide an improved user interface to protect public entry of authentication information and securely perform electronic transactions across a network.

For example, in particular embodiments an augmented or virtual reality user device displays or overlays a virtual authentication object, such as a virtual keypad or virtual combination lock, within a field of view of a user via a display. The user dynamically manipulates the virtual authentication object to enter an authentication code. For example, the user may perform gestures associated with pushing buttons of a keypad.

The augmented or virtual reality user device detects the gestures the user performs when manipulating the virtual authentication object. The combination of the virtual authentication object and the detected gestures may be combined to determine an authentication code. For example, the virtual authentication object may comprise a keypad with nine keys. The user may sequentially press three keys of the keypad labeled "1", "5", and "7", respectively. Given the virtual authentication object and the detected gestures, an authentication server can determine that the user entered the authentication code "157".

The authentication code may be used for various activities such as authorizing an electronic transaction, gaining access to a restricted area, etc. An attacker is unable to observe or record the user entering the authentication code because the virtual authentication object is only visible to the user of the augmented or virtual reality user device. An attacker only observes the user performing gestures, but cannot observe the object the user is manipulating.

Moreover, using a combination of virtual object templates and virtual object overlays, the gestures for entering a particular authentication code may vary each time the user enters the authentication code. Thus, particular embodiments improve the security of an electronic transaction conducted over a network, access to a particular location, etc.

Particular embodiments improve the security of a network, the security of a physical location, the security of a particular transaction, etc., because particular embodiments are not limited to a conventional one-dimensional password. Particular embodiments enable two, three, and even four-dimensional dynamic passwords (e.g., manipulating objects in three-dimensional space over a particular time interval). The dynamic passwords are less susceptible to brute-force attacks than a conventional one-dimensional password.

As another advantage, particular embodiments of a virtual or augmented reality authentication system may be particularly useful for providing authorization, such as network access, to users with vision impairment or other handicaps preventing them from recognizing visual input labels associated with conventional authentication systems, such as a keypad or combination lock. For example, in some embodiments the virtual or augmented reality authentication system enables a vision-impaired person to move a hand or finger in a particular pattern to enter an authentication code. Thus, the virtual or augmented reality dynamic authentication system provides an improved user interface for authentication.

As a particular example, some embodiments include an improved electronic transaction terminal, such as an automatic teller machine, a gas pump, a vending machine, or any other terminal that authenticates a user. In some embodiments, the electronic transaction terminal may include an input device, such as a keypad, for entering an authentication code. The input device may not include any markings (e.g., blank keys on the keypad). An augmented reality user device may overlay values upon the input device. The particular overlay may change each time the user enters an authentication code. Thus, even if an attacker observes the user entering an authentication code, the attacker cannot determine the code.

In other embodiments, the electronic transaction terminal may not include an input device for entering an authentication code. The electronic transaction terminal and the augmented reality user device may both be in communication with an authentication server. The augmented reality user device may display a virtual authentication object to the user. The user may manipulate the virtual object to enter an authentication code. The augmented reality user device may send the user's gestures and the virtual authentication object to the authentication server, which sends an authentication response to the electronic transaction terminal.

In some embodiments, a user may complete an online transaction using a virtual authentication object. For example, in a conventional online transaction, a user may be prompted to enter a security code, such as a credit card security code, verification code, verification value, etc. In particular embodiments, a user may be presented with a virtual authentication object to authorize an online transaction. The virtual or augmented reality user device may send a combination of user gestures and the virtual authentication object to an authentication server to authenticate the transaction, which is more secure than transmitting a conventional security code.

Particular embodiments and their advantages are best understood by reference to FIGS. 1 through 8, wherein like reference numbers indicate like features. An example virtual reality dynamic authentication system is illustrated in FIG. 1.

FIG. 1 is a schematic diagram of an embodiment of a virtual reality system 100 for performing dynamic user authentication. System 100 includes user 102 performing dynamic authentication using virtual reality user device 200. In the illustrated example, virtual reality user device 200 is configured as a head-mounted wearable device. Other examples of wearable devices are integrated into an eyeglass structure, contact lenses or other eyewear structure, a visor structure, a helmet structure, or any other suitable vision-based display structure. In some embodiments, virtual reality user device 200 may be or may be integrated with a mobile user device, such as a mobile phone. Virtual reality user device 200 is described in more detail below with respect to FIG. 2.

Virtual reality user device 200 displays virtual environment 126 to user 102. The virtual environment may be a virtual room, a virtual home, a virtual office, or any other suitable virtual environment. Virtual environment 126 includes virtual authentication object 128.

In the illustrated embodiment, virtual authentication object 128 comprises a numbered keypad. In other embodiments, virtual authentication object 128 may comprise a dial, a combination lock, a three-dimensional object (e.g., a block, or other suitable geometric shape), a combination of two or three-dimensional objects, or any other suitable object or objects that a user may manipulate to enter an authentication code. Additional examples of virtual authentication objects are described with respect to FIGS. 3A-3D.

User 102 may manipulate virtual authentication object 128 to enter an authentication code. For example, user 102 may use a finger to press virtual buttons "1", "3", and "5" in sequence. Virtual reality user device 200 may detect the hand gestures of user 102 as user 102 pushes the virtual buttons. Virtual reality user device 200 detects and stores the gestures in digital form using any suitable computer vision technique.

The combination of virtual authentication object 128 and the gestures performed on virtual authentication object 128 may be combined to determine an authentication code. For example, in some embodiments virtual reality user device 200 has a digital representation of virtual authentication object 128 that includes nine buttons each labeled with a particular number. By comparing the detected gesture with virtual authentication object 128, virtual reality user device 200 determines that the user entered authentication code "135".

In some embodiments, virtual reality user device 200 may send virtual authentication object 128 and the detected gestures to another device for authentication. For example, virtual reality user device 200 may send virtual authentication object 128 and the detected gestures over network 108 to authentication server 122. Authentication server 122 may be operated by an institution, such as an organization, business, government agency, financial institution, university, etc.

Authentication server 122 is a networked device comprising hardware and software to authenticate a user, such as user 102. For example, authentication server 122 includes one or more processors implemented as one or more central processing unit (CPU) chips, logic units, cores (e.g. a multi-core processor), field-programmable gate array (FPGAs), application specific integrated circuits (ASICs), or digital signal processors (DSPs). The one or more processors are configured to implement various instructions to authenticate a user and may be implemented in hardware and/or software. Authentication server 122 includes a memory that stores database 124.

The memory comprises one or more disks, tape drives, or solid-state drives, and may be used as an over-flow data storage device, to store programs when such programs are selected for execution, and to store instructions and data that are read during program execution. The memory may be volatile or non-volatile and may comprise read-only memory (ROM), random-access memory (RAM), ternary content-addressable memory (TCAM), dynamic random-access memory (DRAM), and static random-access memory (SRAM).

Database 124 includes a plurality of records associating a user identifier with an authentication code. The records may include user account data. For example, database 24 may include a record for user 102. User 102 may be associated with authentication code "135". Although many of the described examples use an alpha-numeric authentication code, other embodiments may include any suitable authentication code associated with a user.

Authentication server 122 provides an interface to authenticate a user, such as user 102. For example, application server 122 receives an authentication request. The authentication request may comprise a virtual authentication object, such as virtual authentication object 128, a detected gesture, and an identifier of a user, such as user 102. Using the identifier of the user, authentication server 122 identifies a record corresponding to the user, such as user 102, in database 124.

By combining received virtual authentication object 128 and the received gesture information, authentication server 122 is able to determine an authentication code, such as "135". Authentication server 122 compares the determined authentication code with the authentication code stored in database 124 for user 102. If the authentication codes match, then authentication server 122 authenticates user 102. Authentication server 122 may send an authentication response to virtual reality user device 200 over network 108.

Network 108 comprises a plurality of network nodes configured to communicate data between virtual reality user device 200 and authentication server 122. Examples of network nodes include, but are not limited to, routers, switches, modems, web clients, and web servers. Network 108 comprises any suitable type of wireless and/or wired network including, but not limited to, all or a portion of the Internet, the public switched telephone network, a cellular network, and/or a satellite network. Network 108 is configured to support any suitable communication protocols as would be appreciated by one of ordinary skill in the art upon viewing this disclosure.

System 100 includes particular technical advantages. For example, because user 102 enters an authentication code by manipulating virtual authentication object 128 using virtual reality user device 200, an attacker is unable to observe or record user 102 entering authentication credentials. Thus, particular embodiments improve the security of an electronic transaction conducted over a network.

Figure 2:
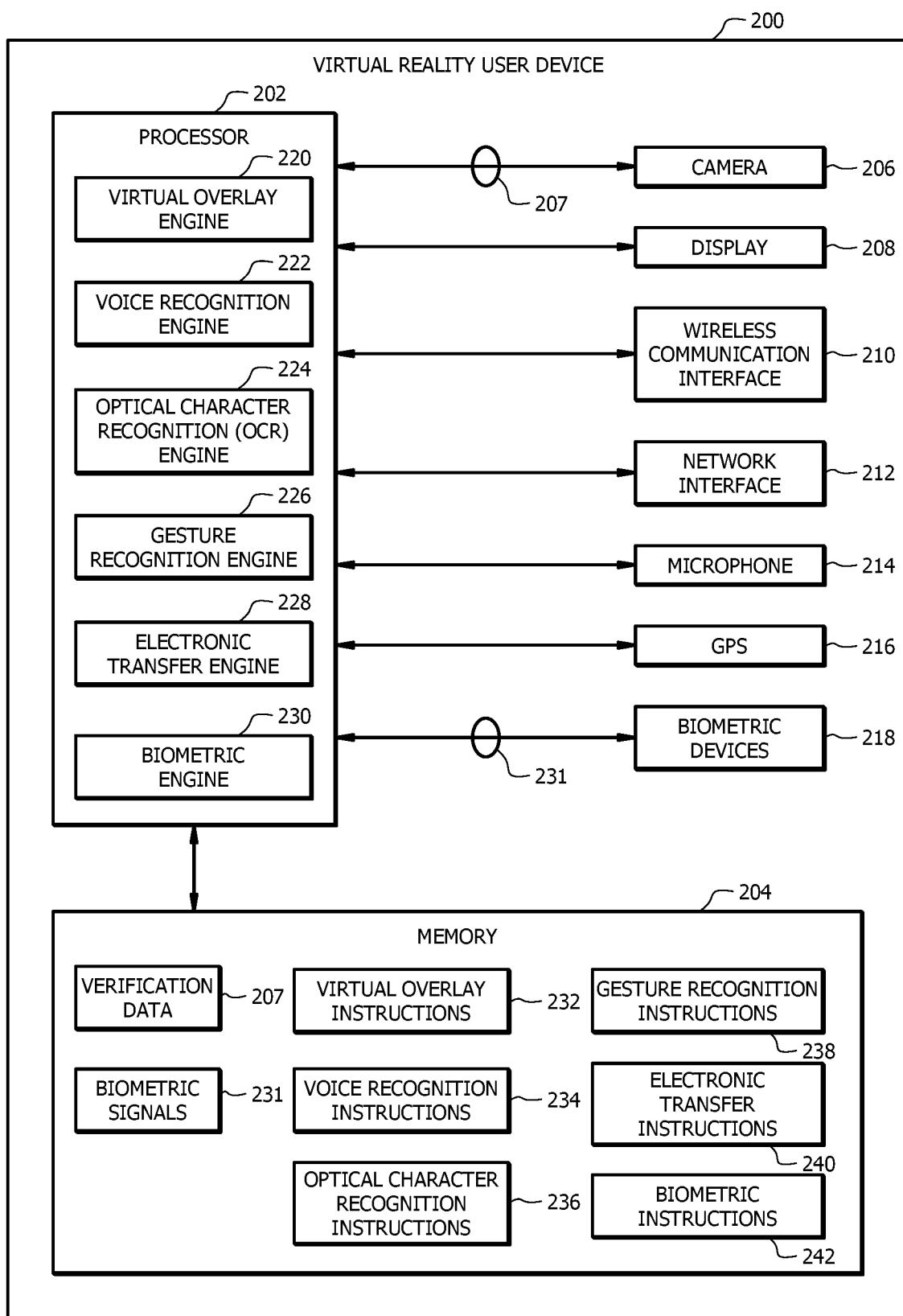
FIG. 2 is a schematic diagram of an embodiment of a virtual reality user device employed by the virtual reality system.

FIG. 2 is a schematic diagram of an embodiment of a virtual reality user device employed by virtual reality system 100. Virtual reality user device 200 is configured to receive virtual authentication object 128, and display virtual authentication object 128 to user 102 via the display of virtual reality environment 126. Virtual reality user device 200 detects one or more gestures performed by user 102 on the displayed virtual authentication object 128. The one or more gestures manipulate the virtual authentication object to enter an authentication code. Virtual reality user device 200 forms an authentication request that includes virtual authentication object 128, the detected one or more gestures, and an identifier of user 102. Virtual reality user device 200 is operable to send the authentication request to authentication server 122 and receive an authentication response from authentication server 122. Examples of virtual reality user device 200 in operation are described in FIGS. 4, 6 and 8.

In some embodiments, virtual reality user device 200 may be referred to as augmented reality user device 200 and virtual environment 126 may be referred to as augmented environment 126. In particular embodiments, virtual reality user device 200 may be operable to display a completely virtual environment or may be operable to augment a physical environment by overlaying virtual objects upon the physical environment.

Virtual reality user device 200 comprises a processor 202, a memory 204, and one or more of a camera 206, a display 208, a wireless communication interface 210, a network interface 212, a microphone 214, a global position system (GPS) sensor 216, and biometric devices 218. Virtual reality user device 200 may be configured as shown or in any other suitable configuration. For example, virtual reality user device 200 may comprise one or more additional components and/or one or more shown components may be omitted.

Examples of camera 206 include, but are not limited to, charge-coupled device (CCD) cameras and complementary metal-oxide semiconductor (CMOS) cameras. Camera 206 is configured to capture images of people, text, and objects within a real environment. Camera 206 is configured to capture images continuously, at predetermined intervals, or on-demand.

For example, camera 206 is configured to receive a command from a user to capture an image. In another example, camera 206 is configured to continuously capture images to form a video stream of images. Camera 206 is operable coupled to an optical character (OCR) recognition engine 224 and/or the gesture recognition engine 226 and provides images to the OCR recognition engine 224 and/or the gesture recognition engine 226 for processing, for example, to identify gestures, text, and/or objects in the field of view of user 102.

Display 208 is configured to present visual information to user 102 using virtual or graphical objects in virtual environment 126 in real-time. In an embodiment, display 208 is a wearable optical head-mounted display configured to reflect projected images for user 102 to see. In another embodiment, display 208 is a wearable head-mounted device comprising one or more graphical display units integrated with the structure of the head-mounted device.

Examples of configurations for graphical display units include, but are not limited to, a single graphical display unit, a single graphical display unit with a split screen configuration, and a pair of graphical display units. Display 208 may comprise graphical display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure.

In another embodiment, the graphical display unit is a graphical display on a user device. For example, the graphical display unit may be the display of a tablet or smart phone configured to display virtual or graphical objects in virtual environment 126 in real-time.

Examples of the wireless communication interface 210 include, but are not limited to, a Bluetooth interface, a radio frequency identifier (RFID) interface, a near-field communication (NFC) interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate communication between processor 202 and other devices. For example, wireless communication interface 210 is configured to facilitate processor 402 sending and receiving signals with other devices for user 102 (e.g. a mobile phone) and/or with devices for other people. Wireless communication interface 210 is configured to employ any suitable communication protocol.

Network interface 212 is configured to enable wired and/or wireless communications and to communicate data through a network, system, and/or domain. For example, network interface 212 is configured for communication with a modem, a switch, a router, a bridge, a server, or a client. Processor 202 is configured to receive data using network interface 212 from a network or a remote source.

Microphone 214 is configured to capture audio signals (e.g. voice commands) from a user and/or other people near user 102. Microphone 214 is configured to capture audio signals continuously, at predetermined intervals, or on-demand. Microphone 214 is operably coupled to the voice recognition engine 222 and provides captured audio signals to the voice recognition engine 222 for processing, for example, to identify a voice command from user 102.

GPS sensor 216 is configured to capture and to provide geographical location information. For example, GPS sensor 216 is configured to provide the geographic location of user 102 employing virtual reality user device 200. GPS sensor 216 is configured to provide the geographic location information as a relative geographic location or an absolute geographic location. GPS sensor 216 provides the geographic location information using geographic coordinates (i.e. longitude and latitude) or any other suitable coordinate system.

Examples of biometric devices 218 include, but are not limited to, retina scanners and finger print scanners. Biometric devices 218 are configured to capture information about a person's physical characteristics and to output a biometric signal 231 based on captured information. A biometric signal 231 is a signal that is uniquely linked to a person based on their physical characteristics. For example, biometric device 218 may be configured to perform a retinal scan of the user's eye and to generate biometric signal 231 for user 102 based on the retinal scan. As another example, biometric device 218 is configured to perform a fingerprint scan of the user's finger and to generate biometric signal 231 for user 102 based on the fingerprint scan. Biometric signal 231 is used by a biometric engine 230 to identify and/or authenticate a person.

Processor 202 is implemented as one or more CPU chips, logic units, cores (e.g. a multi-core processor), FPGAs, ASICs, or DSPs. Processor 202 is communicatively coupled to and in signal communication with the memory 204, camera 206, display 208, wireless communication interface 210, network interface 212, microphone 214, GPS sensor 216, and biometric devices 218. Processor 202 is configured to receive and transmit electrical signals among one or more of memory 204, camera 206, display 208, wireless communication interface 210, network interface 212, microphone 214, GPS sensor 216, and biometric devices 218. The electrical signals are used to send and receive data and/or to control or communicate with other devices. For example, processor 202 transmits electrical signals to operate camera 206. Processor 202 may be operably coupled to one or more other devices (not shown).

Processor 202 is configured to process data and may be implemented in hardware or software. Processor 202 is configured to implement various instructions. For example, processor 202 is configured to implement a virtual overlay engine 220, a voice recognition engine 222, an OCR recognition engine 224, a gesture recognition engine 226, an electronic transfer engine 228, and a biometric engine 230. In an embodiment, virtual overlay engine 220, voice recognition engine 222, OCR recognition engine 224, gesture recognition engine 226, electronic transfer engine 228, and biometric engine 230 are implemented using logic units, FPGAs, ASICs, DSPs, or any other suitable hardware.

Figure 4:
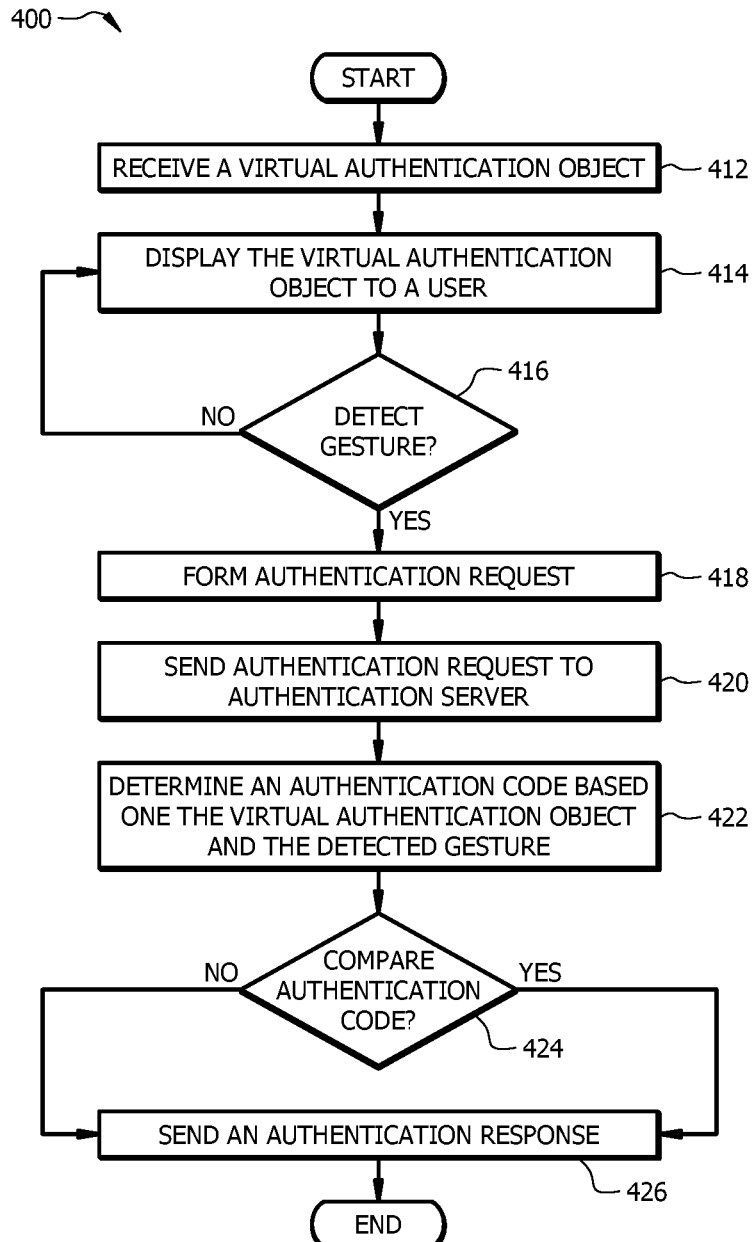
FIG. 4 is a flowchart of an embodiment of a method of dynamically authenticating a user in a virtual reality environment.
Figure 6:
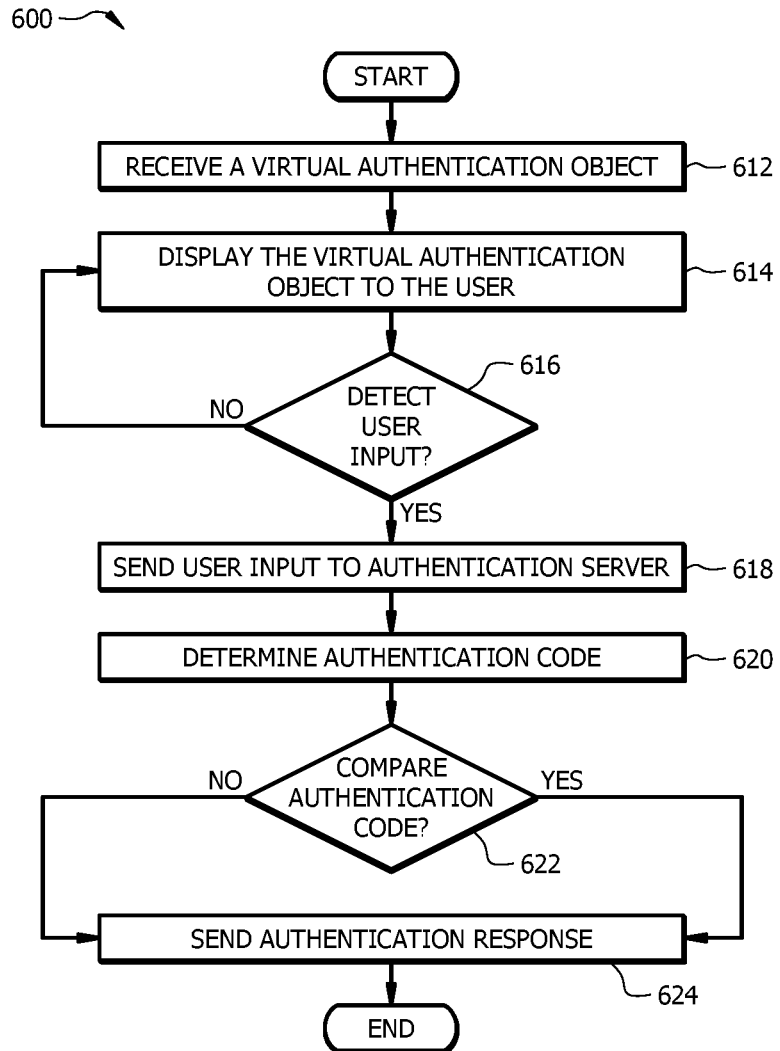
FIG. 6 is a flowchart of an embodiment of a method of dynamically authenticating a user in an augmented reality environment.
Figure 8:
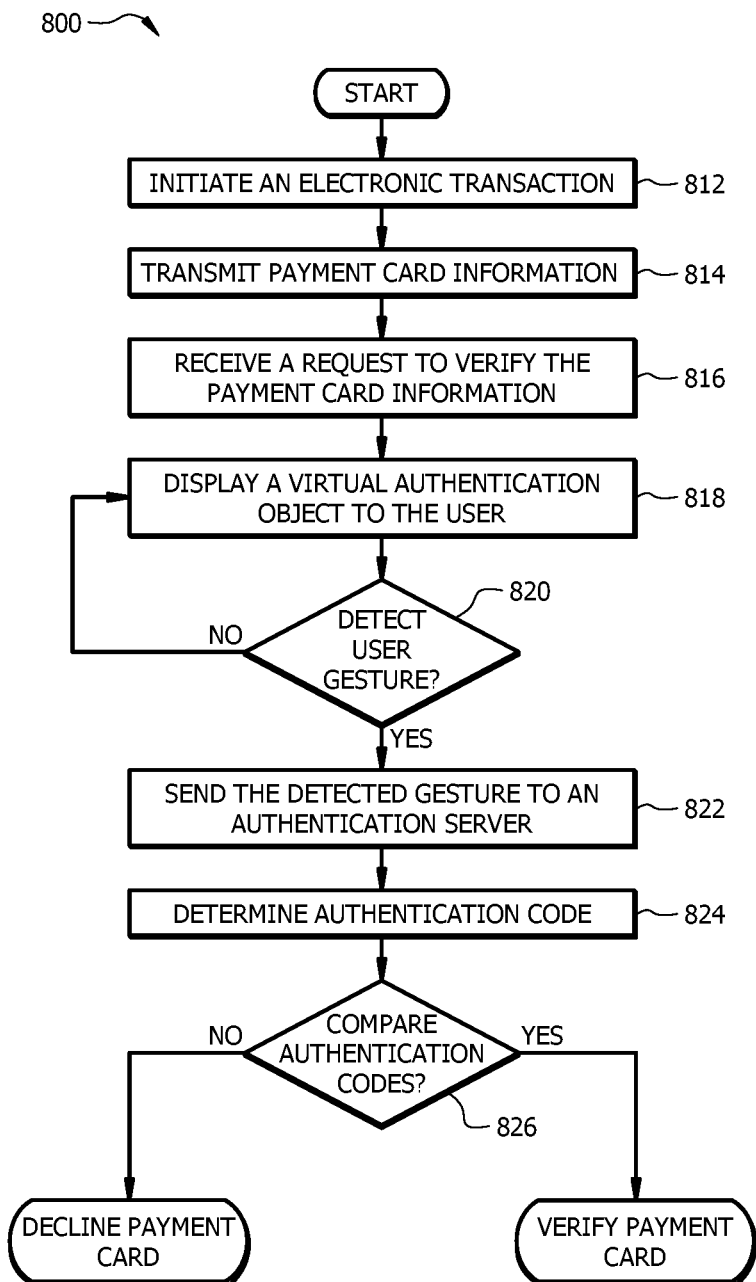
FIG. 8 is a flowchart illustrating an example method of dynamically verifying an electronic transaction.

Virtual overlay engine 220 is configured to present and overlay virtual objects in virtual environment 126 using display 208. For example, display 208 may be head-mounted display that presents virtual objects, such as virtual authentication objects, to a user. Virtual overlay engine 220 is configured to process data to be presented to a user as virtual objects on display 208. Examples of presenting virtual objects in virtual environment 126 are shown in FIGS. 4, 6 and 8.

Voice recognition engine 222 is configured to capture and/or identify voice patterns using microphone 214. For example, voice recognition engine 222 is configured to capture a voice signal from a person and to compare the captured voice signal to known voice patterns or commands to identify the person and/or commands provided by the person. For instance, voice recognition engine 222 is configured to receive a voice signal to authenticate user 102 and/or to identify a selected option or an action indicated by the user.

OCR recognition engine 224 is configured to identify objects, object features, text, and/or logos using images 207 or video streams created from a series of images 207. In one embodiment, OCR recognition engine 224 is configured to identify objects and/or text within an image captured by camera 206. In another embodiment, OCR recognition engine 224 is configured to identify objects and/or text in about real-time on a video stream captured by camera 206 when camera 206 is configured to continuously capture images. OCR recognition engine 224 employs any suitable technique for implementing object and/or text recognition as would be appreciated by one of ordinary skill in the art upon viewing this disclosure.

Gesture recognition engine 226 is configured to identify gestures performed by user 102 and/or other people. Examples of gestures include, but are not limited to, hand movements, hand positions, finger movements, head movements, and/or any other actions that provide a visual signal from a person. For example, gesture recognition engine 226 is configured to identify hand gestures provided by user 102 to indicate various commands such as a command to initiate a request for virtual data for user 102, or to manipulate virtual authentication object 128. Gesture recognition engine 226 employs any suitable technique for implementing gesture recognition as would be appreciated by one of ordinary skill in the art upon viewing this disclosure. Examples of gesture recognition in virtual environment 126 are shown in FIGS. 4, 6 and 8.

Electronic transfer engine 228 is configured to receive a virtual authentication object, such as virtual authentication object 128. Electronic transfer engine 228 may receive virtual authentication object 128 from authentication server 122, from an electronic transaction terminal, from a user terminal, from any other device connected to network 108, or other components of virtual reality user device 200.

Electronic transfer engine 228 is configured to form an authentication request that includes detected gestures. The authentication request may also include virtual authentication object 128, and an identifier of user 102, a transaction identifier, etc. Electronic transfer engine 228 may send the authentication request to authentication server 122. Electronic transfer engine 228 is configured to receive an authentication response from authentication server 122. In particular embodiments, authentication server 122 may comprise part of an electronic transaction terminal or part of an electronic commerce platform. An example of employing electronic transfer engine 228 is described in FIGS. 4, 6 and 8.

Biometric engine 230 is configured to identify a person based on biometric signal 231 generated from the person's physical characteristics. Biometric engine 230 employs one or more biometric devices 218 to identify user 102 based on one or more biometric signals 231. For example, biometric engine 230 receives a biometric signal 231 from biometric device 218 in response to a retinal scan of the user's eye and/or a fingerprint scan of the user's finger. To authenticate a user, biometric engine 230 compares biometric signals 231 from biometric device 218 to verification data 207 (e.g. previously stored biometric signals 231) for the user. Biometric engine 230 authenticates the user when biometric signals 231 from biometric devices 218 substantially match (e.g. is the same as) verification data 207 for the user.

Memory 204 comprise one or more disks, tape drives, or solid-state drives, and may be used as an over-flow data storage device, to store programs when such programs are selected for execution, and to store instructions and data that are read during program execution. Memory 204 may be volatile or non-volatile and may comprise ROM, RAM, TCAM, DRAM, and SRAM. Memory 204 is operable to store images, biometric signals 231, verification data 207, virtual overlay instructions 232, voice recognition instructions 234, OCR recognition instructions 236, gesture recognition instructions 238, electronic transfer instructions 240, biometric instructions 242, and any other data or instructions.

Images may be captured by camera 206 or from other sources. In one embodiment, images are used by virtual reality user device 200 when performing optical character recognition or gesture detection. Images can be captured using camera 206 or downloaded from another source such as a flash memory device or a remote server via an Internet connection.

Verification data 207 comprises any suitable information for identifying and authenticating a virtual reality user device 200 user 102, or an account or other information associated with user 102. In an embodiment, verification data 207 comprise previously stored credential and/or biometric signals 231 stored for users. Verification data 207 is compared to an input provided by user 102 to determine the identity of user 102. When the user's input matches or is substantially the same as verification data 207 stored for user 102, virtual reality user device 200 is able to identify and authenticate user 102. When the user's input does not match verification data 207 stored for user 102, virtual reality user device 200 is unable to identify and authenticate user 102.

In some embodiments, verification data 207 may include an authentication code. Comparing user input to verification data 207 may include combining virtual authentication object 128 with one or more detected gestures performed by user 102 to determine an authentication code and comparing the determined authentication code with the authentication code of verification data 207.

Biometric signals 231 are signals or data that is generated by biometric device 218 based on a person's physical characteristics. Biometric signals 231 are used by virtual reality user device 200 to identify and/or authenticate a virtual reality user device 200 user 102 by comparing biometric signals 231 captured by the biometric devices 218 with previously stored biometric signals 231.

Virtual overlay instructions 232, voice recognition instructions 234, OCR recognition instructions 236, gesture recognition instructions 238, electronic transfer instructions 240, and biometric instructions 242 each comprise any suitable set of instructions, logic, rules, or code operable to execute virtual overlay engine 220, voice recognition engine 222, OCR recognition engine 224, gesture recognition engine 226, electronic transfer engine 228, and biometric engine 230, respectively.

FIGS. 3A-3D are block diagrams of example virtual authentication objects, according to some embodiments. Particular examples are illustrated to describe particular features, but one of ordinary skill in the art will recognize other suitable examples in addition to those illustrated. Features of some examples may be combined with features of other examples.

Figure 3A:
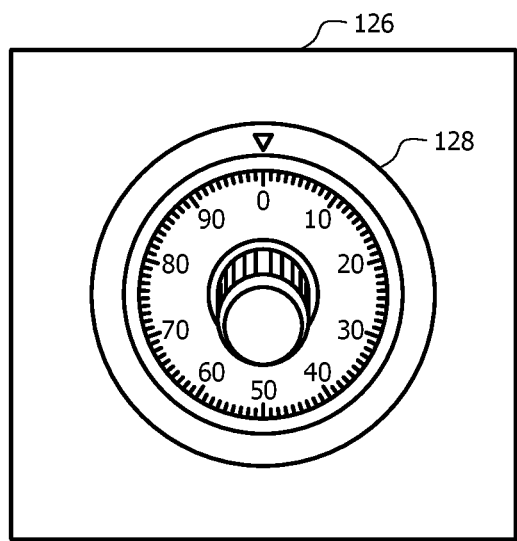
FIGS. 3A-3D are block diagrams of example virtual authentication objects, according to some embodiments.

FIG. 3A is an example of a combination dial virtual authentication object. Virtual environment 126, such as virtual environment 126 described with respect to FIG. 1, includes combination dial 128. Combination dial 128 is a virtual object that exists within virtual environment 126. A person, such as user 102, may view combination dial 128 using virtual reality user device 200.

Combination dial 128 includes a numbered rotating portion. User 102 may virtually manipulate combination dial 128 in virtual environment 126 similar to a dial on a conventional padlock or safe. For example, user 102 may virtually rotate combination dial left, right, or a sequence of left and right rotations. User 102 may virtually rotate combination dial 128 at a particular speed or sequence of varying speeds. User 102 may virtually pause combination dial 128 at particular numbers on the dial for particular lengths of time.

Virtual reality user device 200 may detect the gestures performed by user 102 when manipulating virtual combination dial 128. For example, virtual reality user device 200 may detect a left turning gesture with a pause at number 25 followed by a right turning gesture with a pause at number 45. In some embodiments, virtual reality user device 200 may use a camera to capture hand and finger movements of user 102 manipulating virtual combination dial 128, or user 102 may wear a glove or other sensing device that transmits signals to virtual reality user device 200 for capturing gestures of user 102.

Virtual combination dial 128 provides additional features over a conventional dial on a padlock or safe. For example, in virtual environment 126 virtual reality user device 200 may detect how fast or slow user 102 rotates combination dial 128 and/or how long combination dial 128 pauses at a particular number. Virtual reality user device 200 may use this additional information when determining an authentication code based on the detected gestures.

Figure 3B:
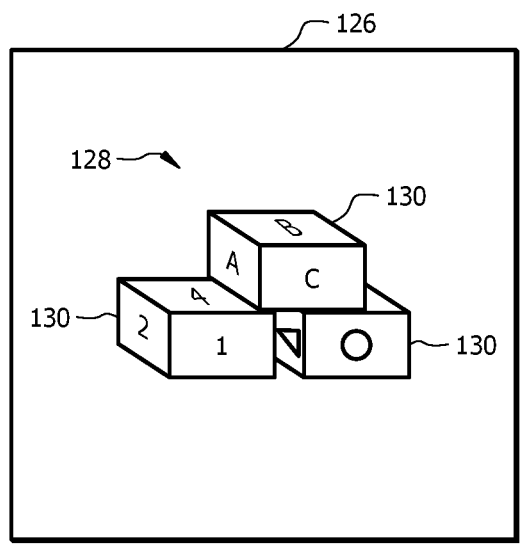

FIG. 3B is an example of a three-dimensional virtual authentication object. Virtual environment 126 includes three-dimensional object 128. Other embodiments may include two-dimensional objects. Three-dimensional object 128 comprises three blocks 130. Blocks 130 may be labeled alpha-numerically, with shapes, colors, etc., or blocks 130 may not be labelled at all. Three-dimensional object 128 is a virtual object that exists within virtual environment 126. A person, such as user 102, may view three-dimensional object 128 using virtual reality user device 200.

User 102 virtually manipulates blocks 130 to enter an authentication code. In some embodiments, user 102 may virtually rotate blocks 130 so that a particular combination of labels are facing forward, or virtual arrange blocks 130 in a particular order. In some embodiments, user 102 may virtually arrange blocks 130 in three-dimensional space. The arrangement of blocks 130 with respect to each other may represent a particular authentication code. The authentication code may also depend on how fast or slow user 102 virtually arranges blocks 130. Virtual reality user device 200 detects the gestures of user 102 as user 102 manipulates blocks 130. In some embodiments, virtual reality user device 200 may use a camera to capture hand and finger movements of user 102 manipulating virtual three-dimensional object 128, or user 102 may wear a glove or other sensing device that transmits signals to virtual reality user device 200 for capturing gestures of user 102.

Although a particular number and shape of three-dimensional objects are illustrated, other embodiments may include any suitable number or shape of objects. In some embodiments, the three-dimensional objects may include any suitable objects such as chess pieces, figurines, puzzle pieces, animals, sports equipment, or any other suitable symbol or object. Some embodiments may include a moldable shape that user 102 molds into a particular configuration to enter an authentication code.

Figure 3C:
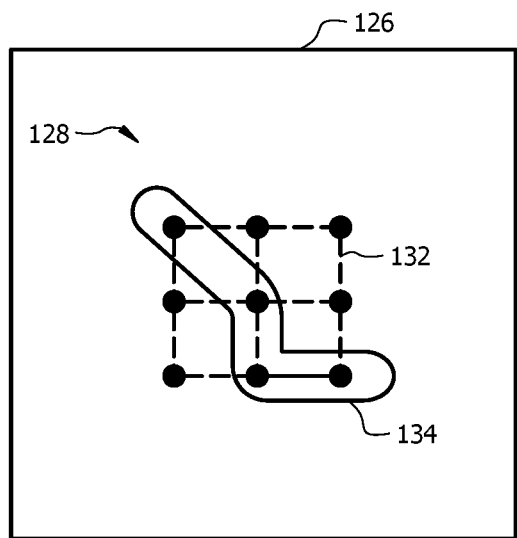

FIG. 3C is an example of an abstract virtual authentication object. Virtual environment 126 includes abstract object 128. Abstract object 128 may be represented by a set of coordinates 132. Coordinates 132 may be displayed as dots, a grid, an arrangement of symbols, or not displayed at all. Coordinates 132 may include one, two, or three dimensional coordinates. Abstract object 128 is a virtual object that exists within virtual environment 126. A person, such as user 102, may view abstract object 128 using virtual reality user device 200.

User 102 traces a pattern across coordinates 132 to enter an authentication code. Pattern 134 illustrates an example path traced by user 102. Virtual reality user device 200 detects the gestures of user 102 as user 102 traces a path across coordinates 132. In some embodiments, the gesture information includes temporal information, such as the speed of the tracing. In some embodiments, virtual reality user device 200 may use a camera to capture hand and finger movements of user 102 manipulating abstract object 128, or user 102 may wear a glove or other sensing device that transmits signals to virtual reality user device 200 for capturing gestures of user 102.

Figure 3D:
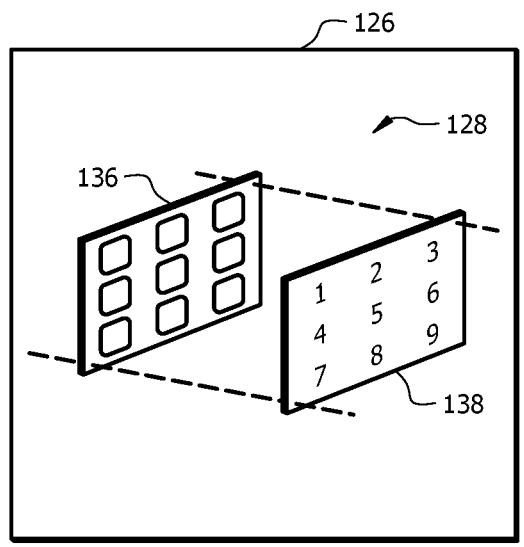

FIG. 3D is an example of a virtual authentication object comprising a virtual object template and a virtual object overlay. Virtual environment 126 includes virtual keypad 128. A person, such as user 102, may view virtual keypad 128 using virtual reality user device 200. Virtual keypad 128 comprises virtual object template 136 and virtual object overlay 138.

Virtual object template 136 is a template for a keypad with three rows of three input keys. Virtual template 136 describes a virtual representation of a structure of the virtual authentication object, which is a keypad in the illustrated example. A virtual object template may not include values for its user inputs. For example, virtual object template 136 does not include values for its input keys.

Virtual object overlay 138 includes an assignment of values to each of the one or more user inputs of virtual object template 136. For example, virtual object overlay 138 specifies numeric values for each input key of virtual object template 136. Multiple virtual object overlays 138 may be used with a single virtual object template 136.

Virtual reality user device 200 may combine virtual object template 136 and virtual object overlay 138 to display virtual authentication object 128, such as virtual authentication object 128 illustrated in FIG. 1. Although a particular example is illustrated, many of the virtual authentication objects described herein may be represented by a combination of virtual object template and virtual object overlay. Additional examples of virtual object templates and overlays are described with respect to FIG. 5.

FIG. 4 is a flowchart of an embodiment of a method of dynamically authenticating a user in a virtual reality environment. Method 400 may be performed by any of the components described with respect to FIGS. 1-3D.

Method 400 begins at step 412, where a virtual reality user device receives a virtual authentication object. The virtual authentication object comprises a virtual representation of an object capable of being manipulated by a user in a particular sequence to enter an authentication code. For example, virtual reality user device 200 may receive (e.g., via electronic transfer engine 228) any of the virtual authentication objects 128 described herein.

In particular embodiments, virtual reality user device 200 may receive virtual authentication object 128 from authentication server 122. In some embodiments, virtual reality user device 200 may receive virtual authentication object 128 from another entity in system 100, or virtual reality user device 200 may be preconfigured with one or more virtual authentication objects 128.

At step 414, the virtual reality user device displays the virtual authentication object to the user via the display of the virtual reality user device. For example, virtual reality user device 200 displays virtual authentication object 128 to user 102 via display 208.

In particular embodiments, the received virtual authentication object may comprise a virtual object template and a virtual object overlay. To display the virtual authentication object, the virtual reality user device may combine the virtual object template and virtual object overlay. For example, virtual reality user device 200 may combine virtual object template 136 and virtual object overlay 138 to display a numeric keypad.

At step 416, the virtual reality user device detects one or more gestures performed by the user on the displayed virtual authentication object. The one or more gestures manipulate the virtual authentication object to enter an authentication code. For example, virtual reality user device 200 may detect a sequence of button presses performed by user 102 on virtual authentication object 128. The sequence of button presses may correspond to the numbered keys "1", "3" and "5", which corresponds to the authentication code "135". The detected gesture may include position information and/or temporal information, as described with respect to FIGS. 3A-3D.

An advantage of particular embodiments is that an attacker cannot determine the authentication code by observing or recording user 102. Even if the attacker is able to capture the gestures of user 102, the attacker is not able to view virtual authentication object 128 that user 102 is manipulating to enter the authentication code, without which the gestures are meaningless. Thus, particular embodiments provide an improved user interface for securely authenticating a user.

If the virtual reality user device does not detect gestures from the user, then the method may return to step 414. If the virtual reality user device successfully detects gestures, then the method continues to step 418.

At step 418 the virtual reality user device forms an authentication request. The authentication request comprises the virtual authentication object, the detected one or more gestures, and an identifier of the user. For example, virtual reality user device 200 may form an authentication request comprising virtual authentication object 128, a digital representation of the gestures performed by user 102 in pressing numbered keys "1", "3" and "5", and an identifier of user 102. In particular embodiments, the identifier of user 102 may comprise a username, an account number, an email address, an alias, biometric information, or any other suitable identifier.

In some embodiments, the authentication request may not include the virtual authentication object. For example, the receiver of the authentication request may have previously sent the virtual authentication object to the virtual reality user device. Thus, the receiver of the authentication request may already be aware of the virtual authentication object and need not receive it back from the virtual reality user device.

In some embodiments, the authentication request may not include a complete virtual authentication object, but instead include a virtual object overlay. For example, the receiver of the authentication request may already be aware of the virtual object template used to form the virtual authentication object (e.g., a keypad), but needs to know which virtual object overlay was used with the keypad (e.g., particular assignment of keys) to properly interpret the detected gestures.

In some embodiments, the authentication request may comprise multiple messages. For example, in particular embodiments the identifier of the user may be sent in a first message, such as a message initiating a session or transaction. The gesture information may be sent in a second message.

At step 420, the virtual reality user device sends the authentication request to an authentication server. For example, virtual reality user device 200 sends (e.g., via electronic transfer engine 228) the authentication request to server 122. In other embodiments, the virtual reality user device may include an authentication server, and may authenticate the user locally.

At step 422, the authentication server determines the authentication code using the virtual authentication object and the detected one or more gestures from the authentication request. For example, authentication server 122 may apply the gestures to virtual authentication object 128 to determine that user 102 entered the authentication code "135".

A particular advantage of some embodiments is that the authentication code is not sent over the network. Thus, if an attacker were to intercept the authentication request, the attacker would need to know how to apply the gestures to the virtual authentication object.

In some embodiments, a virtual object overlay is transmitted in the authentication request. If an attacker were to intercept the authentication request, the attacker would not have the virtual object template to reconstruct the virtual authentication object. Thus, the attacker would not be able to determine the authentication code.

At step 424, the authentication server identifies an authentication code associated with the user identifier from the authentication request by matching the user identifier with a database record for the user identifier. The authentication server compares the determined authentication code with the authentication code associated with the user identifier in the identified database record to authorize the user. For example, authentication server 122 finds a database entry for user 102 to retrieve an authentication code for user 102. Authentication server 122 compares the authentication code with the determined authentication code. If both authorization codes match (e.g., both are "135"), authentication server 122 authenticates the user.

At step 426, the authentication server sends an authentication response to the virtual reality user device. The authentication response includes the authentication results of step 424. For example, authentication server 122 send an authentication response to virtual reality user device 200 indicating that user 102 is authenticated.

Modifications, additions, or omissions may be made to the method of FIG. 4. Additionally, one or more steps in method 400 of FIG. 4 may be performed in parallel or in any suitable order.

Figure 5:
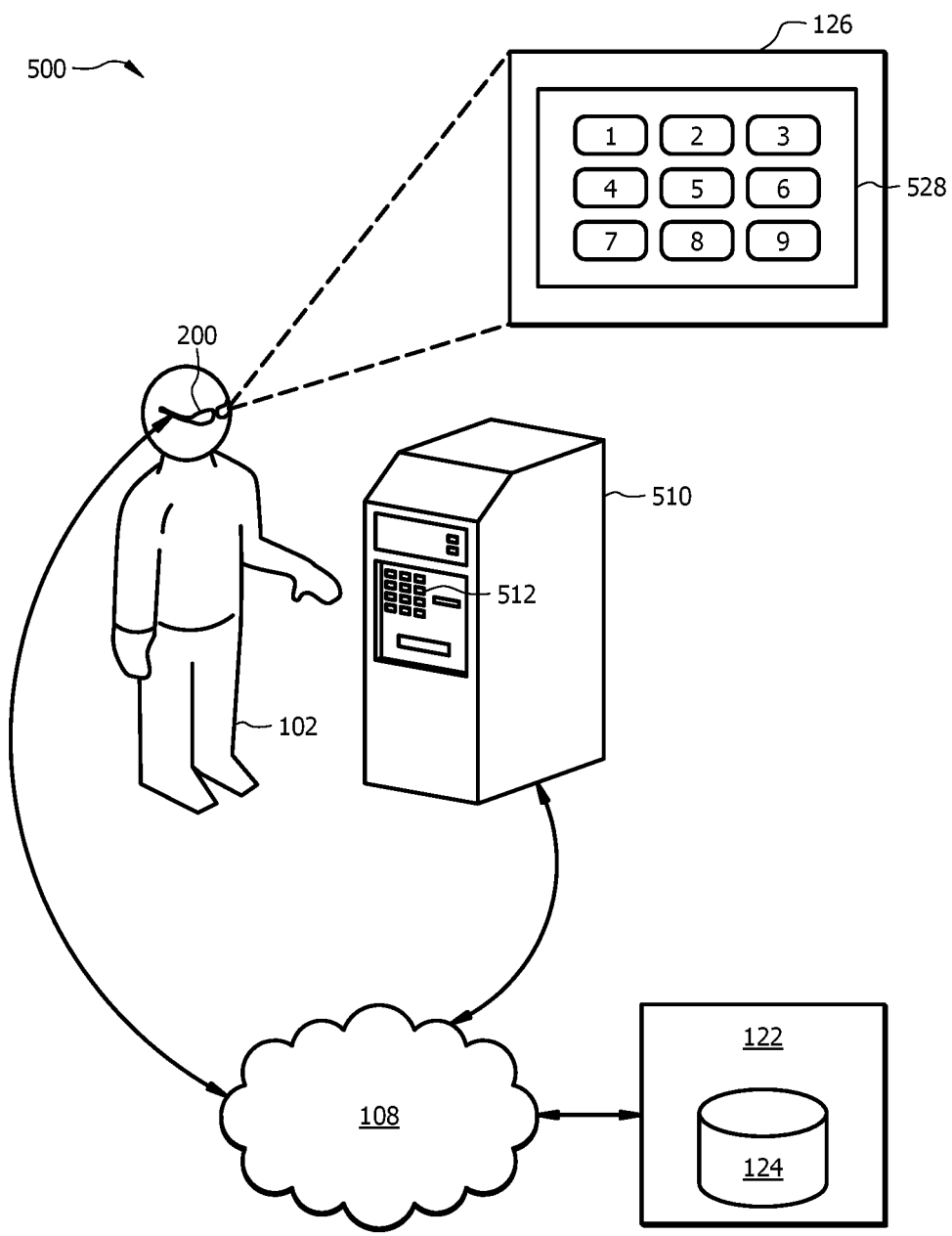
FIG. 5 is a schematic diagram of an embodiment of an augmented reality system for performing dynamic user authorization.

FIG. 5 is a schematic diagram of an embodiment of an augmented reality system 500 for performing dynamic user authorization. System 500 includes user 102 participating in an electronic transaction with electronic transaction terminal 510. User 102 performs dynamic authentication using augmented reality user device 200. Augmented reality user device is similar to virtual reality user device 200 described with respect to FIGS. 1 and 2. User 102, network 108, authentication server 122, and database 124 are similar to those described with respect to FIG. 1.

Electronic transaction terminal 510 comprises a terminal such as an automatic teller machine, vending machine, gas pump, or any other terminal that authenticates a user for access or for accepting payment. In some embodiments, electronic terminal 510 includes input device 512.

Input device 512, such as a keypad, provides an interface for user 102 to enter an authentication code. Input device 512 may be unmarked. For example, input device 512 may comprise a keypad without markings on the keys (i.e., each key is blank).

Augmented reality user device 200 may project values for the inputs of input device 512 in augmented reality environment 126. Augmented reality user device 200 may project values according to virtual object overlay 528 (similar to virtual object overlay 138 described with respect to FIG. 3D). For example, augmented reality user device 200 may project alpha-numeric characters onto each key of a keypad in the field of view of user 102. When user 102 looks at electronic transaction terminal 510 using augmented reality device 200, user 102 sees values on the keys of the keypad.

Virtual object overlay 528 may overlay values on the physical input device in any suitable order, and different virtual object overlays 528 may overlay values in different orders. For example, a first virtual object overlay 528 may overlay values numerically (e.g., 1, 2, 3, 4, 5, 6, 7, 8, 9), another virtual object overlay 528 may reverse the order (e.g., 9, 8, 7, 6, 5, 4, 3, 2, 1), another virtual object overlay 528 may use an arbitrary order (e.g., 3, 2, 1, 7, 5, 6, 4, 8, 9), or any suitable order. Changing the values overlayed on the physical keys prevents an attacker from knowing which values are entered.

For example, an advantage of particular embodiments is that an attacker cannot determine the authentication code by observing or recording user 102, like an attacker may be able to do with a conventional electronic transaction terminal. Even if the attacker is able to observe the buttons that user 102 presses, the attacker is not able to view virtual overlay 528 to determine the values assigned to the buttons. The particular virtual overlay 528 may vary with each transaction. Thus, even if an attacker is able to observe and repeat the sequence of physical button presses, the observation is useless because the sequence of physical button presses may be different for each transaction. Thus, particular embodiments provide an improved user interface for securely entering an authentication code at an electronic transaction terminal, such as an automated teller machine.

In some embodiments, electronic transaction terminal 510 may not include input device 512. Electronic transaction terminal 510 and augmented reality user device 200 may both be in communication with authentication server 122. Augmented reality user device 200 may display a virtual authentication object, such as virtual authentication object 128 described with respect to FIGS. 1-3D, to user 102. User 102 may manipulate virtual authentication object 102 to enter an authentication code. Augmented reality user device 200 may send the user's gestures and virtual authentication object 128 to authentication server 122, which sends an authentication response to electronic transaction terminal 510.

Electronic transaction terminal 510 includes hardware and software to process an electronic transaction. For example, electronic transaction terminal 510 includes one or more processors implemented as one or more central processing unit (CPU) chips, logic units, cores (e.g. a multi-core processor), field-programmable gate array (FPGAs), application specific integrated circuits (ASICs), or digital signal processors (DSPs). The one or more processors are configured to implement various instructions to process an electronic transaction and may be implemented in hardware and/or software.

Augmented reality user device 200 displays augmented reality environment 126 to user 102. Augmented reality environment 126 may include virtual object overlay 528 displayed upon input device 512 of electronic transaction terminal 510.

In particular embodiments, electronic transaction terminal 510 may include authentication server 122. In some embodiments, the same institution may operate or control electronic transaction terminal 510 and authentication server 122. In other embodiments, different institutions may operate or control electronic transaction terminal 510 and authentication server 122. For example, electronic transaction terminal 510 may comprise an automatic teller machine operated by a particular bank, and authentication server 122 may comprise a database of user accounts operated by the bank.

In some embodiments, the virtual reality user device may include additional security measures. In particular embodiments, the virtual reality user device may identify objects at the user's location. For example, a user may predefine one or more authorized automatic teller machines. If the virtual reality user device cannot validate a particular automatic teller machine (e.g., based on geographic position information, an identifying mark on the automatic teller machine, etc.) the virtual reality user device may decline to project an augmented reality overlay onto the unauthorized automatic teller machine.

In another embodiment, an electronic transaction terminal may comprise a point of sale system at a retail location. The user may preselect a particular register (e.g., checkout aisle 2) as an authentication point. If the user pays for a purchase at the preselected register, the virtual reality user device may project an augmented reality overlay onto the register. If payment is attempted at a different register, however, the virtual reality user device may decline to project the augmented reality overlay onto the register.

FIG. 6 is a flowchart of an embodiment of a method of dynamically authenticating a user in an augmented reality environment. Method 600 may be performed by any of the components described with respect to FIGS. 1-5.

The method begins at step 612, where an augmented reality user device receives a virtual authentication object. In some embodiments the virtual authentication object may comprise a virtual object overlay.

As a first example, augmented reality user device 200 may receive (e.g., via electronic transfer engine 228) virtual object overlay 528. Virtual object overlay 528 may comprise an assignment of values to each of the keys of the plurality of keys of input device 512 of electronic transaction terminal 510. In particular embodiments, electronic transaction terminal 510 may comprise, for example, an automatic teller machine and input device 512 comprises a keypad. The keypad may not include markings on its keys.

As a second example, augmented reality user device 200 may receive (e.g., via electronic transfer engine 228) virtual authentication object 128, such as any of virtual authentication objects 128 described with respect to FIGS. 1-3D. In particular embodiments electronic transaction terminal 510 may comprise, for example, an automatic teller machine without input device 512.

In particular embodiments, the augmented reality user device may receive the virtual authentication object from the electronic transaction terminal. In some embodiments, the augmented reality user device may receive the virtual authentication object from the authentication server. In some embodiments, the electronic transaction terminal may receive the virtual authentication object from the authentication server and send it to the augmented reality user device. In particular embodiments, the augmented reality user device may be preconfigured with one or more virtual authentication objects.

At step 614, the augmented reality user device displays the virtual authentication object to the user. In some embodiments, the augmented reality user device displays the virtual authentication object on its display. In some embodiments, the augmented reality user device displays a graphical representation of a virtual keypad overlay on the physical inputs of the electronic transaction terminal such that the assignment of values appears on the plurality of user inputs.

As a first example where electronic transaction terminal 510 includes an automatic teller machine with keypad 512, augmented reality user device 200 may display a graphical representation of virtual object overlay 528 on the physical keypad of the automatic teller machine such that the values assigned by virtual object overlay 528 (e.g., assignment of alpha-numeric characters) appear on the keys of the physical keypad.

As a second example where electronic transaction terminal 510 includes an automatic teller machine without keypad 512, augmented reality user device 200 may display any of virtual authentication objects 128 described with respect to FIGS. 1-3D to user 102. In some embodiments, augmented reality user device 200 may display a virtual keypad to user 102.

At step 616, user input is detected. In some embodiments, the electronic transaction terminal may detect an input sequence entered by the user on its physical keypad. In some embodiments, the augmented reality user device may detect one or more gestures performed by the user on the displayed virtual authentication object. The one or more gestures manipulate the virtual authentication object to enter the authentication code.

As a first example where electronic transaction terminal 510 includes an automatic teller machine with keypad 512, the automatic teller machine may detect a sequence of key presses on keypad 512. For example, the automatic teller machine may detect that the first key on the first keypad row was pressed, followed by the third key on the first row, followed by the middle key in the second row.

As a second example where electronic transaction terminal 510 includes an automatic teller machine without keypad 512, augmented reality user device 200 may detect a sequence of button presses performed by user 102 on virtual authentication object 128. The sequence of button presses may correspond to the numbered keys "1", "3" and "5", which corresponds to the authentication code "135". The detected gesture may include position information and/or temporal information, as described with respect to FIGS. 3A-3D.

An advantage of particular embodiments is that an attacker cannot determine the authentication code by observing or recording user 102. Even if the attacker is able to observer the sequence of physical buttons pressed by user 102 or observed the gestures of user 102, the attacker is not able to view virtual object overlay 528 or virtual authentication object 128, without which the button presses or gestures are meaningless. Thus, particular embodiments provide an improved user interface for securely authenticating a user.

If the augmented reality user device does not detect user input, then the method may return to step 614. If the augmented reality user device successfully detects gestures, then the method continues to step 618.

At step 618, the user input is sent to the authentication server. In some embodiments, the augmented reality user device forms an authentication request. The authentication request may comprise the virtual authentication object and the detected one or more gestures. The augmented reality user device sends the authentication request to the authentication server. In some embodiments, the electronic transaction terminal sends the detected input sequence to the authentication server.

As a first example, electronic transaction terminal 510 may send (e.g., via electronic transfer engine 228) the input sequence detected in step 616 to authentication server 122. In some embodiments, electronic transaction terminal 510 may also send virtual object overlay 528 to authentication server 122.

For example, authentication server 122 may not know what virtual keypad overlay the augmented reality user device used (e.g., augmented reality user device 200 autonomously selected virtual keypad overlay 528, or received virtual keypad overlay 528 from electronic transaction terminal 510). In such embodiments, the overlay information is sent to the authentication server. The overlay information may be sent to directly from the augmented reality user device, directly from the electronic transaction terminal, or relayed through the electronic transaction terminal.

As a second example, augmented reality user device 200 may form an authentication request. The authentication request may include virtual reality object 128 and the gestures detected in step 616. Augmented reality user device 200 may send (e.g., via electronic transfer engine 228) the authentication request to authentication server 122. In some embodiments, augmented reality user device 200 may send the authentication request to authentication server 122 via electronic transaction terminal 510.

In some embodiments, the authentication request may not include the virtual authentication object. For example, the authentication server may have previously sent the virtual authentication object to the augmented reality user device, and thus the authentication server may already know which virtual authentication object is associated with the detected gestures.

In particular embodiments, electronic transaction terminal 510 may comprise an automatic teller machine and a bank where user 102 maintains a bank account may operate or control authentication server 122.

A particular advantage of some embodiments is that the authentication code is not sent over the network. Thus, if an attacker were to intercept the authentication request or the detected input sequence, the attacker would need to know how to apply the gestures or input sequence to the virtual authentication object.

At step 620, the authentication server determines the authentication code. In some embodiments, the authentication server may determine the authentication code using the received input sequence and the virtual keypad overlay. In some embodiments, the authentication server may determine the authentication code using the virtual authentication object and the detected one or more gestures from the authentication request.

As a first example, virtual keypad overlay 528 may assign the numerical values 1-9, in sequence, to the nine keys of keypad 512. The received input sequence may indicate that the first key on the first keypad row was pressed, followed by the third key on the first row, followed by the middle key in the second row. Based on virtual keypad overlay 528, authentication server 122 determines that the first key press corresponds to "1", the second to "3", and the third to "5", resulting in an authentication code of "135".

As a second example, authentication server 122 may apply the received gestures to the known or received virtual authentication object 128 to determine that user 102 entered the authentication code "135". Authentication server 122 may apply the received gestures according to any of the embodiments described with respect to FIGS. 1-5.

At step 622, the authentication server compares the determined authentication code with the authentication code associated with the user in the database. For example, authentication server 122 may compare the authentication code determined at step 620 with an authentication code in database 124 for user 102.

In particular embodiments, database 124 may comprise user accounts. The user accounts may be identified by name, account number, email address, phone number, or any other suitable identifier for a user, such as user 102. The authentication code may include a pin number, security code, password, or another information suitable for authenticating a user, such as user 102.

If the compared authentication codes do not match, then the user is not authenticated. If the compared authentication codes match, then user is authenticated.

At step 624, the authentication server sends an authentication response to the electronic transaction terminal. For example, authentication server 122 may send an authentication response to electronic transaction terminal 510 authenticating user 102.

Modifications, additions, or omissions may be made to the method of FIG. 6. Additionally, one or more steps in method 600 of FIG. 6 may be performed in parallel or in any suitable order.

Figure 7:
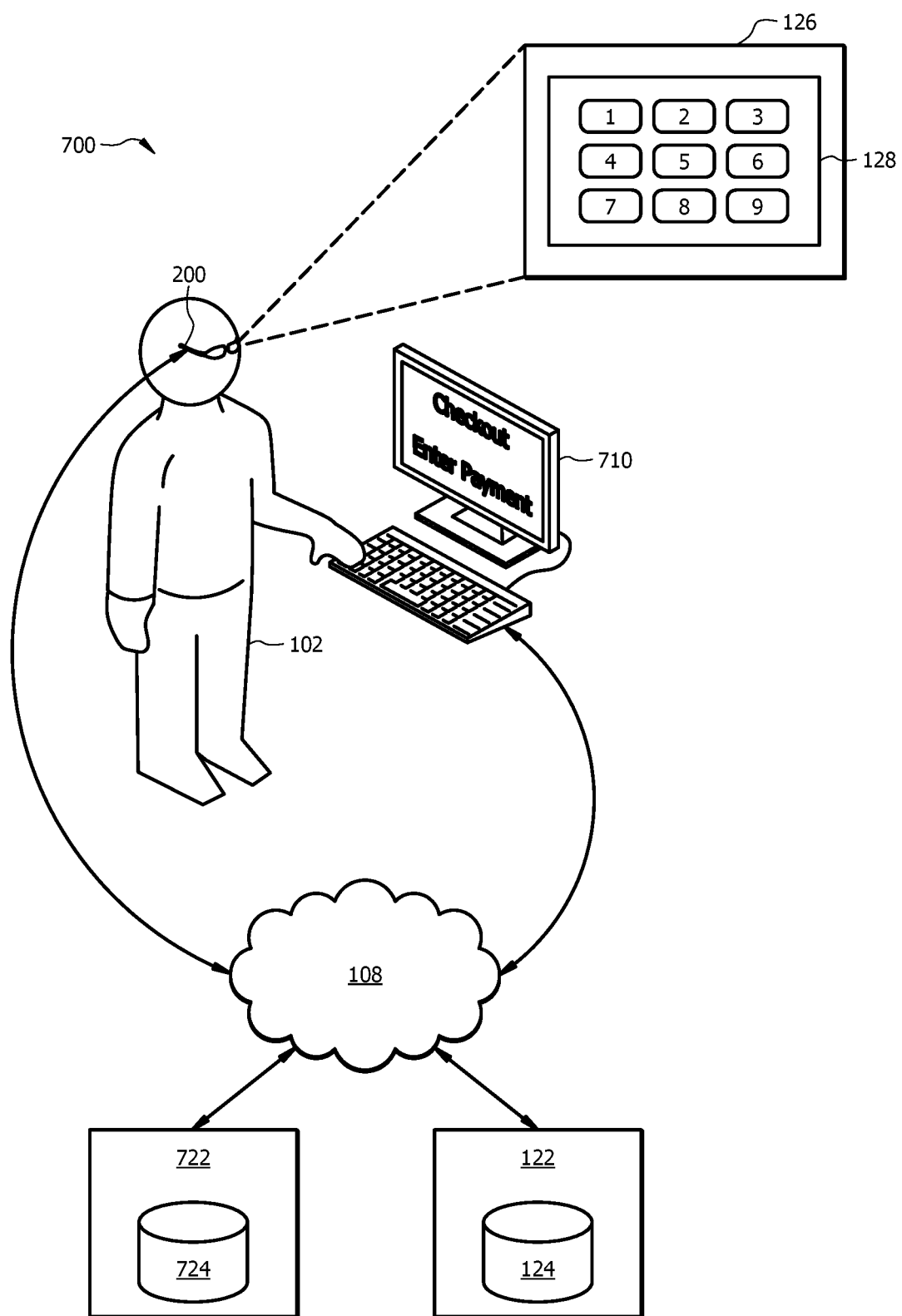
FIG. 7 is a schematic diagram illustrating an example augmented reality system for performing dynamic verification of an electronic transaction.

FIG. 7 is a schematic diagram illustrating an example augmented reality system 700 for performing dynamic verification of an electronic transaction. User 102, augmented reality user device 200, network 108, authentication server 122, and database 124 are similar to those described above with respect to FIGS. 1-6. System 700 includes user 102 participating in an electronic transaction with user terminal 710.

An electronic transaction may comprise an online purchase, such as a purchase from an e-commerce website, an online auction checkout, or any other transaction where payment information may be exchanged over a network, such as network 108. For example, many electronic commerce websites include a virtual shopping cart where users add items to the cart. To complete the purchase, the user performs a "checkout." As part of the checkout, a user typically enters payment information, shipping information, etc. The user may type the information into a web-based form. In some embodiments, the electronic transaction may be referred to as a card-not-present transaction.

User terminal 710 comprises any suitable computing device for performing an electronic transaction. User terminal 710 may comprise a desktop computer, a laptop computer, a tablet, a mobile phone, etc. User terminal 710 may communicate data over network 108 with transaction server 722, authentication server 122, and/or augmented reality user device 200.

As part of the electronic transaction, user 102, via user terminal 710, may transmit payment card information. In some embodiments, user terminal 710 may transmit payment card information to transaction server 722.

As part of the electronic transaction, user 102 may be prompted to provide verification information for the payment card. For example, user 102 may be prompted to provide an authentication code. In conventional systems, the user may enter a CVV code into a web-based form at the user terminal. A problem with conventional systems is that an attacker may observe the CVV code as the user enters the CVV code or an attacker may intercept the CVV code in transit over the network.

In particular embodiments, user 102 performs dynamic authentication using augmented reality user device 200. An advantage of particular embodiments is that an attacker cannot determine the authentication code by observing or recording user 102. Even if the attacker is able to capture the gestures of user 102, the attacker is not able to view virtual authentication object 128 that user 102 is manipulating to enter the authentication code, without which the gestures are meaningless. Thus, particular embodiments provide an improved user interface for verifying an electronic transaction and a more secure network for transmitting verification information.

In some embodiments, augmented reality user device 200 may receive (e.g., via electronic transfer engine 228) a virtual authentication object, such as any of virtual authentication objects 128 described above with respect to FIGS. 1-3D. Augmented reality user device 200 may receive virtual authentication object 128 from authentication server 122, transaction server 722, user terminal 710, or augmented reality user device 200 may be preconfigured with one or more virtual authentication objects 128.

Augmented reality user device 200 displays virtual authentication object 128 to user 102. User 102 may manipulate virtual authentication object 102 to enter an authentication code. Augmented reality user device 200 detects and captures the user's gestures. Augmented reality user device 200 may send the detected gestures and/or virtual authentication object 128 to authentication server 122.

Authentication server 122 comprises database 124. In particular embodiments, database 124 may comprise database records associating a payment card and/or information about the payment card with an authentication code. For example, database 124 may include records for a credit card, a debit card, a reward card, etc. The information may include account numbers, card numbers, user name, user address, user contact information, security information, etc.

Authentication server 122 combines the received gesture information with virtual authentication object 128 to determine an authentication code. For example, user 102 may have performed gestures to press buttons labeled "1", "3" and "5" on a virtual keypad. By combining the gestures with the keypad virtual authentication object 128, authentication server 122 determines the authentication code is "135". Authentication server 122 compares the determined authentication code with the authentication code stored in database 124 for the payment card. If the authentication codes match, then authentication server 122 verifies the payment card for use with the electronic transaction. Authentication server 122 may send an authentication response to transaction server 722 over network 108.

In particular embodiments, transaction server 722 may include authentication server 122 or authentication server 122 may include transaction server 722. Transaction server 122 may be operated by an institution, such as an organization, business, government agency, financial institution, university, etc. In some embodiments, transaction server 722 is operated by a different institution than authentication server 122. For example, transaction 722 may be operated by a retail business and authentication server 122 may be operated by a financial institution. In other embodiments, the same institution may operate transaction server 722 and authentication server 122.

Transaction server 722 is a networked device comprising hardware and software to perform an electronic transaction. For example, transaction server 722 includes one or more processors implemented as one or more central processing unit (CPU) chips, logic units, cores (e.g. a multi-core processor), field-programmable gate array (FPGAs), application specific integrated circuits (ASICs), or digital signal processors (DSPs). The one or more processors are configured to implement various instructions to perform electronic transactions and may be implemented in hardware and/or software. Transaction server 722 includes a memory that stores database 724.

The memory comprises one or more disks, tape drives, or solid-state drives, and may be used as an over-flow data storage device, to store programs when such programs are selected for execution, and to store instructions and data that are read during program execution. The memory may be volatile or non-volatile and may comprise read-only memory (ROM), random-access memory (RAM), ternary content-addressable memory (TCAM), dynamic random-access memory (DRAM), and static random-access memory (SRAM).

Database 724 includes a plurality of records for electronic transactions. The records may include purchased items, payment information, user information, time/date of transaction, etc. In some embodiments, database 724 may include transactions identifiers.

A transaction identifier identifies a particular transaction. For example, transaction server 722 may assign a transaction identifier to refer to a particular electronic transaction with user terminal 710. Transaction server 722 may exchange the transaction identifier with any one or more of user terminal 710, augmented reality user device 200, and/or authentication server 122. For example, transaction server 722 may include a transaction identifier in an authentication request sent to authentication server 122. Authentication server 122 may respond to the authentication request and the response may include the transaction identifier from the request.

FIG. 8 is a flowchart illustrating an example method of dynamically verifying an electronic transaction. Method 800 may be performed by any of the components described with respect to FIGS. 1-7.

Method 800 begins at step 812, where a user terminal initiates an electronic transaction on behalf of a user. For example, user 102 may initiate a card-not-present electronic transaction, such as an online shopping cart checkout, using user terminal 710. In particular embodiments, transaction server 722 may provide the online shopping cart.

At step 814, the user terminal transmits information about a payment card to be used to complete the electronic transaction. For example, user 102 may type credit card information into a web-based form. User terminal 710 transmits the credit card information. In some embodiments, user terminal 710 transmits the credit card information to transaction server 722.

At step 816, an augmented reality user device receives a request to verify the information about the payment card to be used to complete the electronic transaction. The request includes a virtual authentication object. The virtual authentication object comprises a virtual representation of an object capable of being manipulated by a user in a particular sequence to enter an authentication code. For example, augmented reality user device 200 may receive (e.g., via electronic transfer engine 228) any of the virtual authentication objects 128 described herein.

In particular embodiments, augmented reality user device 200 may receive virtual authentication object 128 from authentication server 122 or transaction server 722. In some embodiments, virtual reality user device 200 may receive virtual authentication object 128 from another entity in system 700, or virtual reality user device 200 may be preconfigured with one or more virtual authentication objects 128.

At step 818, the augmented reality user device displays the virtual authentication object to the user via the display of the virtual reality user device. For example, augmented reality user device 200 displays virtual authentication object 128 to user 102 via display 208.

In particular embodiments, the received virtual authentication object may comprise a virtual object template and a virtual object overlay. To display the virtual authentication object, the augmented reality user device may combine the virtual object template and virtual object overlay. For example, augmented reality user device 200 may combine virtual object template 136 and virtual object overlay 138 to display a numeric keypad.

At step 820, the augmented reality user device detects one or more gestures performed by the user on the displayed virtual authentication object. The one or more gestures manipulate the virtual authentication object to enter an authentication code. For example, augmented reality user device 200 may detect a sequence of button presses performed by user 102 on virtual authentication object 128. The sequence of button presses may correspond to the numbered keys "1", "3" and "5", which corresponds to the authentication code "135". The detected gesture may include position information and/or temporal information, as described with respect to FIGS. 3A-3D.

If the augmented reality user device does not detect gestures from the user, then the method may return to step 818. If the augmented reality user device successfully detects gestures, then the method continues to step 822.

At step 822 the augmented reality user device sends the detected one or more gestures to an authentication server. For example, augmented reality user device 200 may send a digital representation of the gestures performed by user 102 in pressing numbered keys "1", "3" and "5". In some embodiments, the detected gestures may be sent to the authentication server via the transaction server.

In particular embodiments, augmented reality user device 200 may send virtual authentication object 128 and/or a transaction identifier to authentication server 122. Augmented reality user device 200 may send a virtual object overlay, such as virtual object overlay 138, to authentication server 122. For example, the receiver of the authentication request may already be aware of the virtual object template used to form the virtual authentication object (e.g., a keypad), but needs to know which virtual object overlay was used with the keypad (e.g., particular assignment of keys) to properly interpret the detected gestures.

At step 824, the authentication server determines the authentication code using the virtual authentication object and the detected one or more gestures from the authentication request. For example, authentication server 122 may apply the gestures to virtual authentication object 128 to determine that user 102 entered the authentication code "135".

A particular advantage of some embodiments is that the authentication code is not sent over the network. Thus, if an attacker were to intercept the authentication request, the attacker would need to know how to apply the gestures to the virtual authentication object.

In some embodiments, a virtual object overlay is transmitted in the authentication request. If an attacker were to intercept the authentication request, the attacker would not have the virtual object template to reconstruct the virtual authentication object. Thus, the attacker would not be able to determine the authentication code.

At step 826, the authentication server compares the determined authentication code with an authentication code associated with the payment card in a database record for the payment card to verify the electronic transaction. For example, authentication server 122 may compare the authentication code determined at step 824 with an authentication code in database 124 for the payment card. If the compared authentication codes match, then the electronic transaction is verified.

Modifications, additions, or omissions may be made to the method of FIG. 8. Additionally, one or more steps in method 800 of FIG. 8 may be performed in parallel or in any suitable order.

Some embodiments may include other security information in combination with the virtual authentication objects. For example, in some embodiments the virtual reality user device may scan the user's immediate surroundings for situational input. If the virtual reality user device detects a busy or unsafe location, the virtual reality user device may present additional authentication objects, or may deny access until a later time.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for authorizing an electronic transaction in an augmented reality environment, the system comprising:
   a user terminal, an augmented reality user device, and an authentication server;
   the user terminal comprising one or more processors operable to:
      initiate an electronic transaction on behalf of a user; and
      transmit information about a payment card to be used to complete the electronic transaction;
   the augmented reality user device comprising:
      a display configured to overlay virtual objects onto a field of view of the user in real-time; and
      one or more processors coupled to the display;
      the one or more processors operable to:
         receive a request to verify the information about the payment card to be used to complete the electronic transaction, the request comprising a virtual authentication object, the virtual authentication object comprising a virtual representation of an object capable of being manipulated by the user in a particular sequence to enter a first authentication code;
         display the virtual authentication object to the user via the display;
         detect one or more gestures performed by the user on the displayed virtual authentication object, the one or more gestures manipulating the virtual authentication object to enter the first authentication code; and
         send the detected one or more gestures to the authentication server;
   the authentication server comprising:
      a memory operable to store a database, the database comprising one or more records associating a payment card with a second authentication code; and
      one or more processors coupled to the memory, the one or more processors operable to:
         receive the detected one or more gestures from the augmented reality user device;
         determine the first authentication code using the virtual authentication object and the detected one or more gestures; and
         compare the determined first authentication code with the second authentication code associated with the payment card in a database record for the payment card to verify the electronic transaction.

2. The system of claim 1, wherein the one or more processors of the augmented reality user device are further operable to send the virtual authentication object to the authentication server.

3. The system of claim 1, wherein the one or more processors of the augmented reality user device are operable to receive the request to verify the electronic transaction from the authentication server.

4. The system of claim 1, wherein the one or more processors of the augmented reality user device are operable to receive the request to verify the electronic transaction from a transaction server.

5. The system of claim 1, wherein:
the one or more processors of the augmented reality user device are further operable to:
receive a transaction identifier associated with the electronic transaction;
associate the detected one or more gestures with the transaction identifier; and
send the transaction identifier to the authentication server.

6. The system of claim 1, wherein the virtual authentication object comprises a plurality of virtual objects that are capable of being individually manipulated.

7. The system of claim 1, wherein the detected gesture includes temporal information associated with a speed at which the user manipulated the virtual authentication object.

8. A method of authorizing an electronic transaction in an augmented reality environment, the method comprising:
initiating an electronic transaction on behalf of a user;
transmitting information about a payment card to be used to complete the electronic transaction;
receiving, by an augmented reality user device, a request to verify the information about the payment card to be used to complete the electronic transaction, wherein:
the request comprises a virtual authentication object;
the virtual authentication object comprises a virtual representation of an object capable of being manipulated by the user in a particular sequence to enter a first authentication code; and
the augmented reality user device comprises a display configured to overlay virtual objects onto a field of view of a user in real-time;
displaying the virtual authentication object to the user via the display;
detecting one or more gestures performed by the user on the displayed virtual authentication object, the one or more gestures manipulating the virtual authentication object to enter the first authentication code;
sending the detected one or more gestures to an authentication server, the authentication server comprising a database comprising one or more records associating a payment card with a second authentication code;
determining, by the authentication server, the first authentication code using the virtual authentication object and the detected one or more gestures; and
comparing the determined first authentication code with the second authentication code associated with the payment card in a database record for the payment card to verify the electronic transaction.

9. The method of claim 8, further comprising sending, by the augmented reality user device, the virtual authentication object to the authentication server.

10. The method of claim 8, wherein the request to verify the electronic transaction is received from the authentication server.

11. The method of claim 8, wherein the request to verify the electronic transaction is received from a transaction server.

12. The method of claim 8, further comprising:
receiving, by the augmented reality user device, a transaction identifier associated with the electronic transaction;
associating the detected one or more gestures with the transaction identifier; and
sending the transaction identifier to the authentication server.

13. The method of claim 8, wherein the virtual authentication object comprises a plurality of virtual objects that are capable of being individually manipulated.

14. The method of claim 8, wherein the detected gesture includes temporal information associated with a speed at which the user manipulated the virtual authentication object.

15. A system for authorizing an electronic transaction in an augmented reality environment, the system comprising:
an augmented reality user device and an authentication server;
the augmented reality user device comprising:
a display configured to overlay virtual objects onto a field of view of the user in real-time; and
one or more processors coupled to the display;
the one or more processors operable to:
receive a request to verify information about a payment card used in an electronic transaction, the request comprising a virtual authentication object, the virtual authentication object comprising a virtual representation of an object capable of being manipulated by the user in a particular sequence to enter a first authentication code;
display the virtual authentication object to the user via the display;
detect one or more gestures performed by the user on the displayed virtual authentication object, the one or more gestures manipulating the virtual authentication object to enter the first authentication code; and
send the detected one or more gestures to the authentication server;
the authentication server comprising:
a memory operable to store a database, the database comprising one or more records associating a payment card with a second authentication code; and
one or more processors coupled to the memory, the one or more processors operable to:
receive the detected one or more gestures from the augmented reality user device;
determine the first authentication code using the virtual authentication object and the detected one or more gestures; and
compare the determined first authentication code with the second authentication code associated with the payment card in a database record for the payment card to verify the electronic transaction.

16. The system of claim 15, wherein the one or more processors of the augmented reality user device are further operable to send the virtual authentication object to the authentication server.

17. The system of claim 15, wherein the one or more processors of the augmented reality user device are operable to receive the request to verify the electronic transaction from the authentication server.

18. The system of claim 15, wherein the one or more processors of the augmented reality user device are operable to receive the request to verify the electronic transaction from a transaction server.

19. The system of claim 15, wherein:
the one or more processors of the augmented reality user device are further operable to:
receive a transaction identifier associated with the electronic transaction;

associate the detected one or more gestures with the transaction identifier; and send the transaction identifier to the authentication server.

20. The system of claim 15, wherein the virtual authentication object comprises a plurality of virtual objects that are capable of being individually manipulated.

* * * * *